US011871743B2

(12) United States Patent
Hori

(10) Patent No.: US 11,871,743 B2
(45) Date of Patent: Jan. 16, 2024

(54) TRAP FOR USE WITH VACUUM CLEANER

(71) Applicant: Barrierhome Co., Ltd., Osaka (JP)

(72) Inventor: Tamotsu Hori, Osaka (JP)

(73) Assignee: BARRIERHOME CO., LTD., Osaka (JP)

( * ) Notice: Subject to any disclaimer, the term of this patent is extended or adjusted under 35 U.S.C. 154(b) by 0 days.

(21) Appl. No.: 17/928,393

(22) PCT Filed: Jun. 30, 2021

(86) PCT No.: PCT/JP2021/024847
§ 371 (c)(1),
(2) Date: Nov. 29, 2022

(87) PCT Pub. No.: WO2022/004821
PCT Pub. Date: Jan. 6, 2022

(65) Prior Publication Data
US 2023/0189781 A1    Jun. 22, 2023

(30) Foreign Application Priority Data

Jul. 1, 2020 (JP) ................................. 2020-113892
Oct. 30, 2020 (JP) ................................. 2020-182826

(51) Int. Cl.
*A01M 5/02* (2006.01)
*A47L 9/06* (2006.01)
(Continued)

(52) U.S. Cl.
CPC .............. *A01M 5/02* (2013.01); *A47L 9/0693* (2013.01); *A47L 9/104* (2013.01); *A47L 9/122* (2013.01); *A47L 9/248* (2013.01)

(58) Field of Classification Search
CPC .......... A47L 9/04; A47L 9/0693; A47L 9/104; A47L 9/122; A47L 9/248; A47L 9/0045;
(Continued)

(56) References Cited

U.S. PATENT DOCUMENTS 5,435,327 A * 7/1995 Ho ..................... A45D 24/32
34/100
5,768,748 A * 6/1998 Silvera ............... A01K 13/001
119/664
(Continued)

FOREIGN PATENT DOCUMENTS

FR    2 848 778    12/2002
JP    55-117278    8/1980
(Continued)

OTHER PUBLICATIONS

English Translation of JP-2003033130-A (Year: 2003).*
(Continued)

*Primary Examiner* — Don M Anderson
*Assistant Examiner* — Robert C Moore
(74) *Attorney, Agent, or Firm* — GREENBLUM & BERNSTEIN, P.L.C.

(57) ABSTRACT

A trap for use with a vacuum cleaner includes a trap body formed in a substantially cylindrical shape. The trap body includes a suction opening formed at one axial end to suck in a target to be trapped and an insertion opening formed at the other end to be inserted into a vacuum cleaner. An adhesive is provided on at least a portion of an inner surface of the trap body. The trap for use with a vacuum cleaner includes a net portion. The net portion blocks a plane orthogonal to an axial direction of the trap body. The net portion includes a net formed in at least a portion to transmit air sucked in through the suction opening. The trap body includes a protrusion formed on at least a portion in a circumferential direction of an outer surface thereof to protrude outward.

11 Claims, 14 Drawing Sheets

(51) Int. Cl.
*A47L 9/10* (2006.01)
*A47L 9/12* (2006.01)
*A47L 9/24* (2006.01)

(58) Field of Classification Search
CPC ............ A47L 9/24; A47L 9/244; A47L 7/009; A01M 5/02; A01M 5/06; A01M 5/08; A01M 5/00; A01M 1/06; A01M 1/14
USPC .......................................................... 15/347
See application file for complete search history.

(56) References Cited

U.S. PATENT DOCUMENTS

| | | | |
|---|---|---|---|
| 7,798,177 B1 * | 9/2010 | Blair .................... | F16L 37/098 138/155 |
| 8,701,338 B1 | 4/2014 | Walsh, Jr. | |
| 2002/0083550 A1 | 7/2002 | Yang | |
| 2022/0183520 A1 * | 6/2022 | Reeder ............... | B23Q 11/0071 |

FOREIGN PATENT DOCUMENTS

| | | | | |
|---|---|---|---|---|
| JP | 10-179001 | | 7/1998 | |
| JP | 3057893 | | 6/1999 | |
| JP | 2003-33130 | | 2/2003 | |
| JP | 2003033130 A | * | 2/2003 | ............ A01M 3/00 |
| JP | 3114853 U | * | 10/2005 | ............ A01M 1/14 |
| JP | 2007136120 A | * | 6/2007 | ............ A47L 9/02 |
| JP | 2008-263875 | | 11/2008 | |
| JP | 4378663 | | 12/2009 | |
| JP | 2010-22300 | | 2/2010 | |
| SE | 533038 C2 | * | 6/2010 | ............ A47L 9/104 |
| WO | 2018/176129 | | 10/2018 | |

OTHER PUBLICATIONS

English Translation of SE-533038-C2 (Year: 2010).*
English Translation of JP-2007136120-A (Year: 2007).*
English Translation of JP-3114853-U (Year: 2005).*
Official Action Issued in Chinese application No. 202180038408.6, dated Apr. 22, 2023.
Official communication in international patent application No. PCT/JP2021/024847 dated Sep. 21, 2021, along with English translation.
Decision to Grant a Patent (Office Action) issued in Japanese patent application No. 2022-508977 dated Jul. 12, 2022 (and dated Jul. 26, 2022), along with an English translation thereof.
English language translation of Official Action issued in Chinese application No. 202180038408.6, dated Apr. 22, 2023.

* cited by examiner

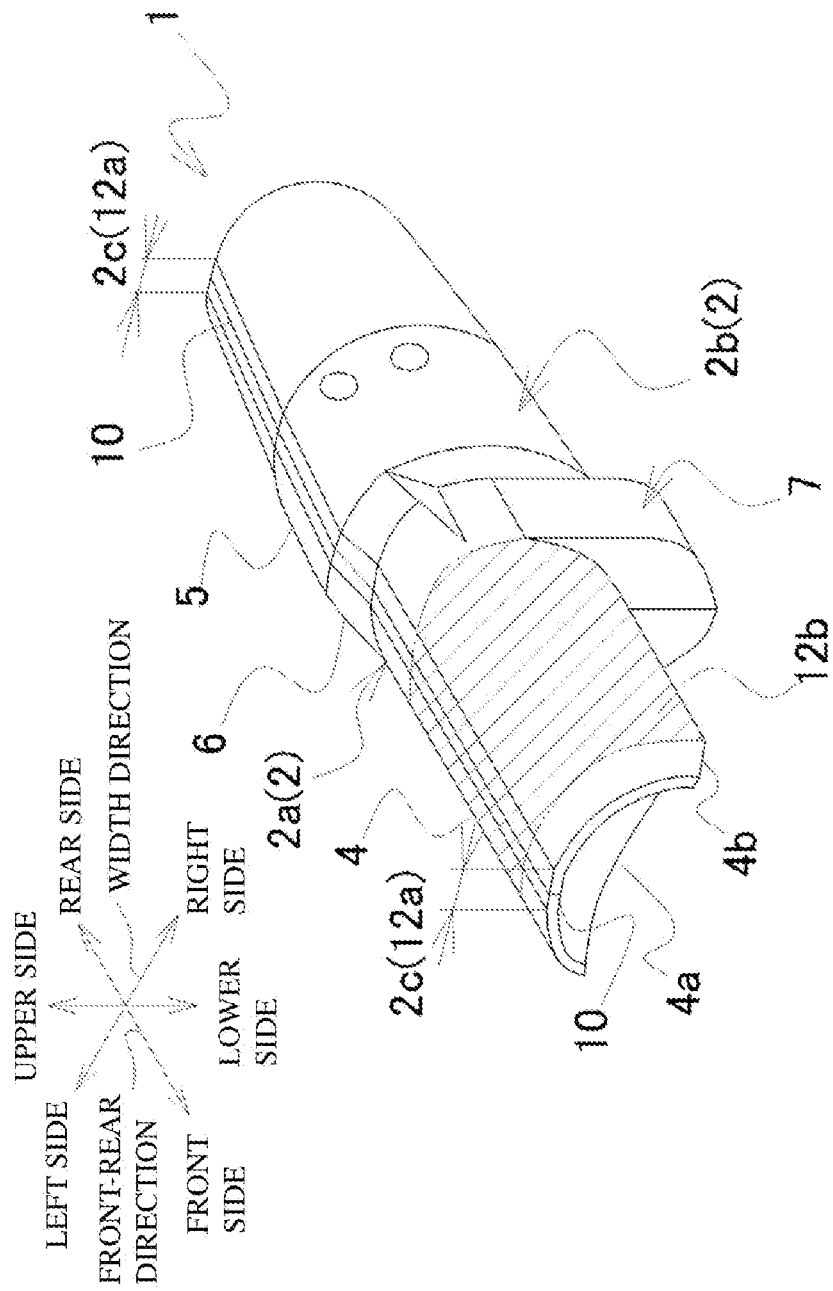

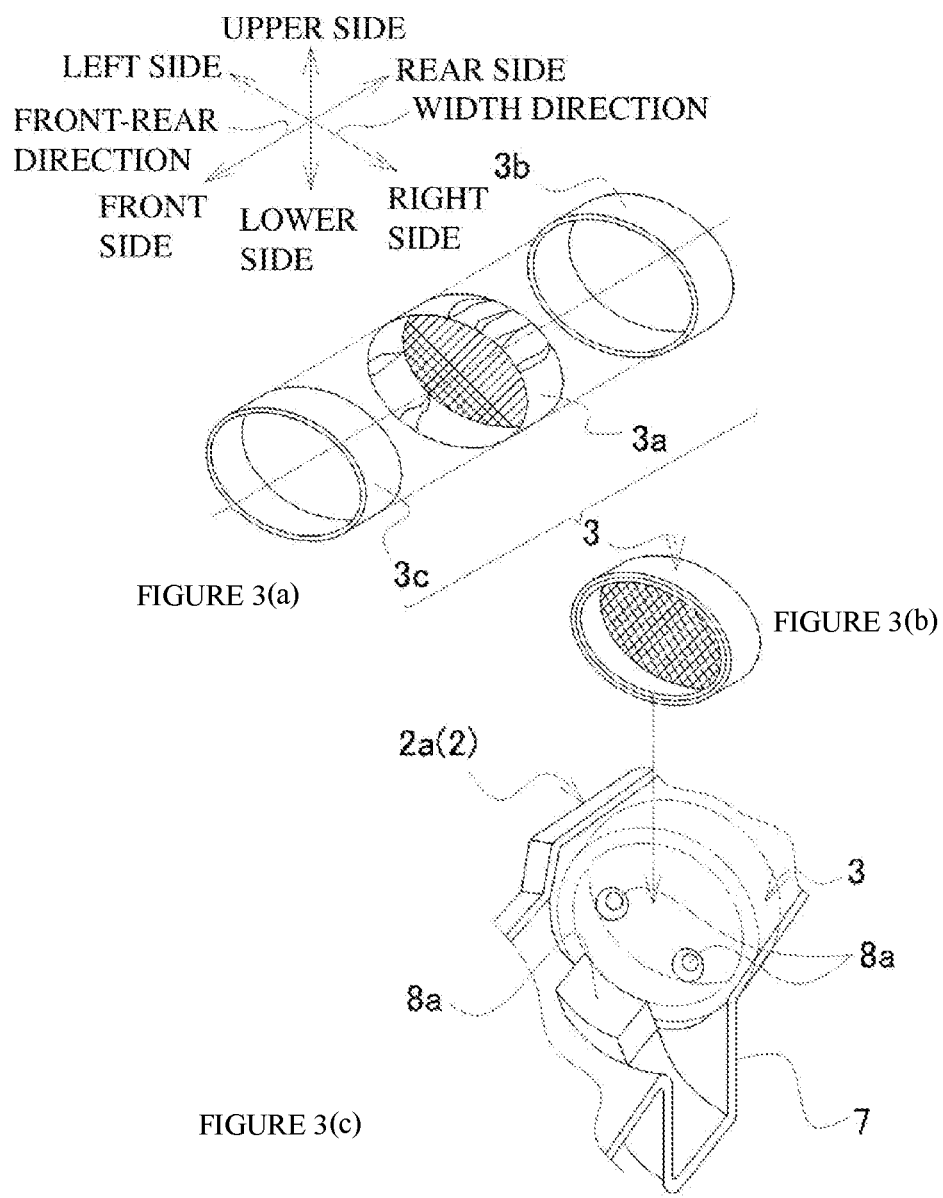

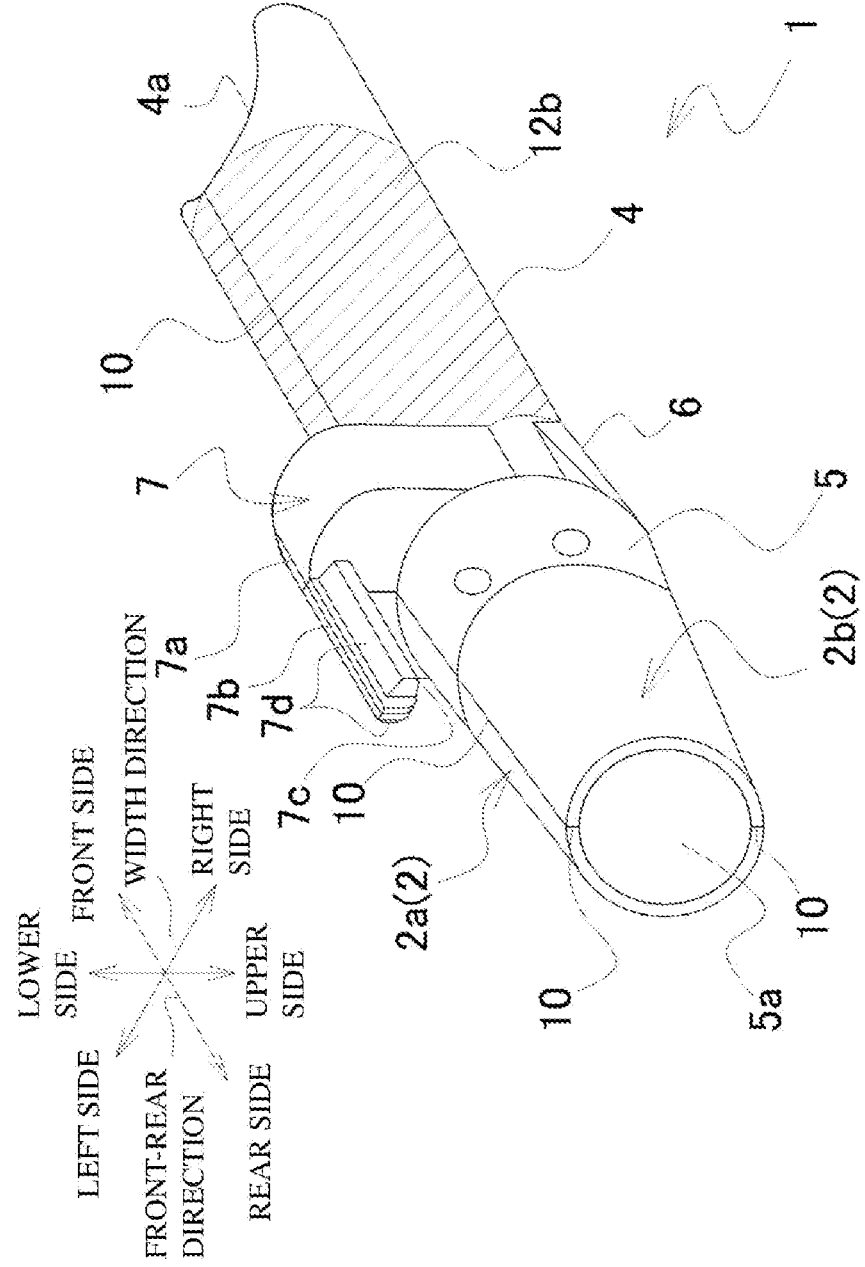

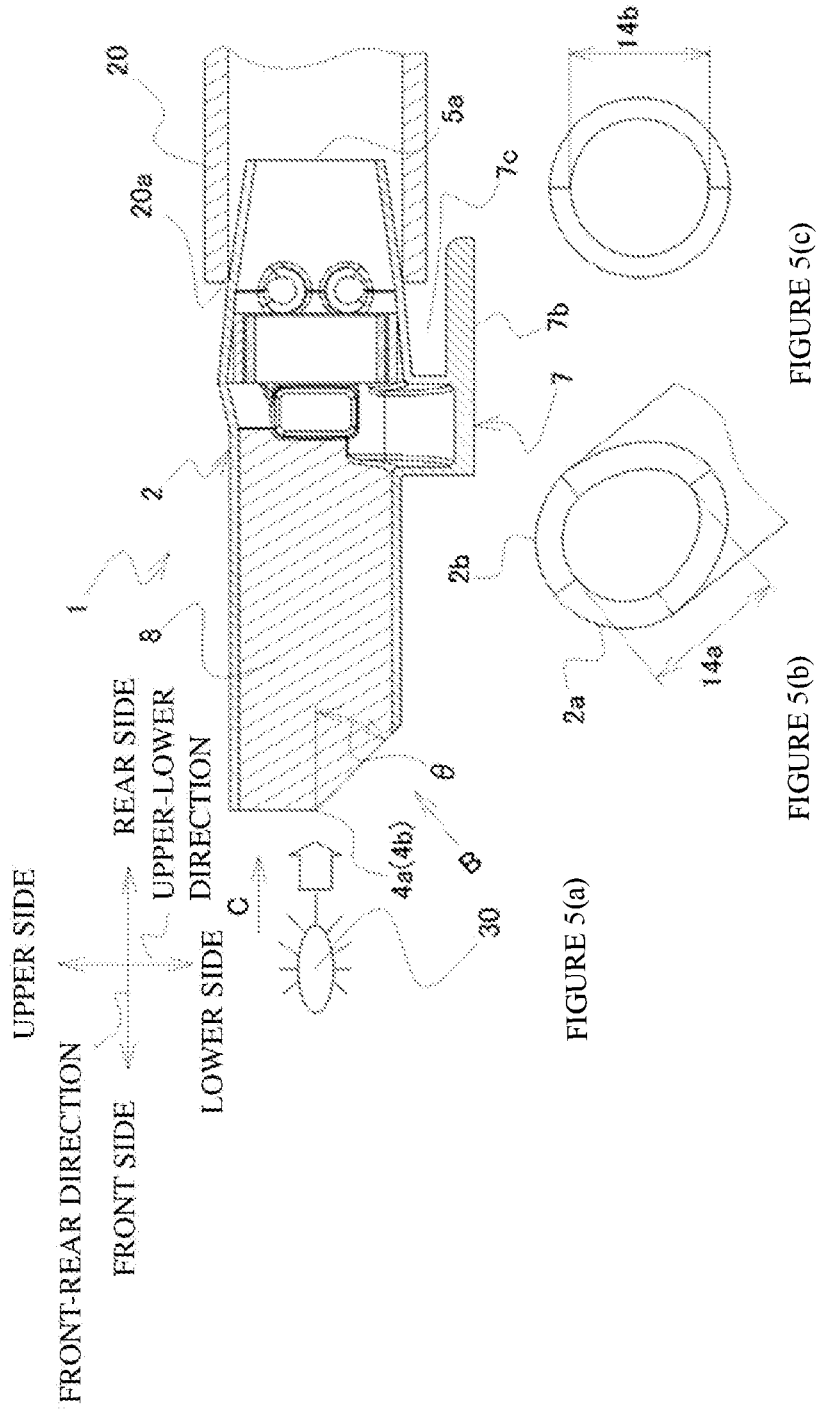

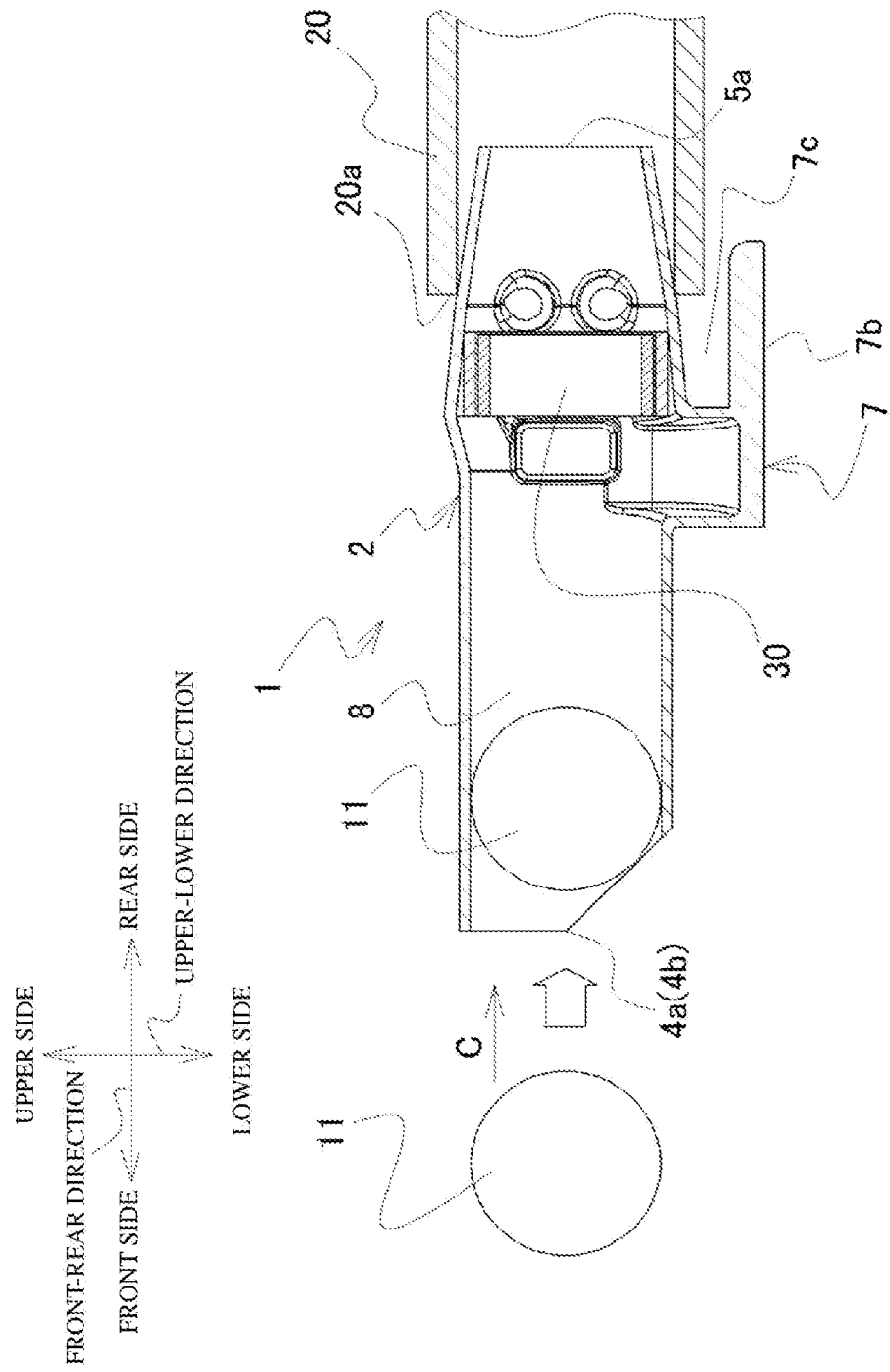

TRAP FOR USE WITH VACUUM CLEANER

TECHNICAL FIELD

The present invention relates to a trap for use with a vacuum cleaner that is detachably attached to a suction hose of a vacuum cleaner to trap a target to be trapped by utilizing a suction force of the vacuum cleaner.

BACKGROUND ART

Methods utilizing the suction force of an electric vacuum cleaner to trap targets to be trapped, such as cockroaches and flies, have been proposed in the past.

For example, Patent Literature 1 discloses a bag for trapping a target to be trapped, which is used in a state inserted in the suction hose of an electric vacuum cleaner through a joint of the suction hose. The bag for trapping a target to be trapped has an entrance portion having a diameter larger than a diameter of the suction hose; a bottom portion; and a body portion between the entrance portion and the bottom portion that can be inserted into the suction hose, wherein an adhesive material is adhered along a predetermined inner circumferential region of the body portion. This bag for trapping a target to be trapped can be of a disposable type that, after use, can be removed from the joint of the suction hose and disposed of immediately.

CITATION LIST

Patent Literature

Patent Literature 1: JP-A-H10-179001

SUMMARY OF INVENTION

Technical Problem

Unfortunately, the trap for use with a vacuum cleaner (bag for trapping a target to be trapped) disclosed in Patent Literature 1 is attached to the suction hose by inserting the body portion into the suction hose. This requires the user of the trap for use with a vacuum cleaner to push the body portion rather hard into the suction hose, in order to bring the body portion into pressure contact with the suction hose. Moreover, after trapping the target to be trapped, the trap for use with a vacuum cleaner is removed from the suction hose, and replaced with a new one. However, the pressure contact of the body portion with the suction hose not only places a load on the suction hose, but also makes it difficult to easily remove the trap for use with a vacuum cleaner. Furthermore, the user needs to directly touch the entrance portion to remove the trap for use with a vacuum cleaner, such that the user may touch the target to be trapped that has been trapped. That is, the conventional trap for use with a vacuum cleaner has the problem of not being easily removable from the suction hose.

Additionally, after use, the trap for use with a vacuum cleaner disclosed in Patent Literature 1 is removed with the entrance portion open. In the trap for use with a vacuum cleaner, the target to be trapped is trapped with the adhesive provided on the body portion. Unfortunately, because the trap for use with a vacuum cleaner is difficult to remove from the suction hose, it has the problem that when removed vigorously, the target to be trapped may escape from the entrance portion.

It is therefore an object of the present invention to provide a trap for use with a vacuum cleaner that, after sucking a target to be trapped by the vacuum cleaner, is easily removable from a vacuum cleaner attachment portion, and can prevent the target to be trapped from escaping.

Solution to Problem

The present invention provides a trap for use with a vacuum cleaner that is detachably attached to a suction hose of a vacuum cleaner to trap a target to be trapped by utilizing a suction force of the vacuum cleaner. The trap for use with a vacuum cleaner includes a trap body with a substantially cylindrical shape, the trap body including a suction opening formed at one end to suck in the target to be trapped and an insertion opening formed at the other end to be inserted into the suction hose of the vacuum cleaner; and a net portion mounted to the trap body to block a plane orthogonal to an axial direction of the trap body, and including a net formed in at least a portion to transmit air sucked in through the suction opening. The trap body includes, in an axially central portion, a protrusion formed on at least a portion in a circumferential direction of an outer surface thereof to protrude outward. An adhesive is provided on at least a portion of an inner surface of the trap body.

Thus, the trap for use with a vacuum cleaner includes a protrusion protruding from the outer surface of the trap body. This allows the trap for use with a vacuum cleaner to be easily removed from the suction hose of the vacuum cleaner, by applying an external force to the protrusion.

In a preferred embodiment of the trap for use with a vacuum cleaner, the protrusion has an inner space communicating with an inner space of the trap body. In a more preferred embodiment of the trap for use with a vacuum cleaner, the adhesive is also provided on the inner space of the protrusion. Thus, the target to be trapped that has been trapped by the trap for use with a vacuum cleaner is caught in the inner space of the protrusion. Even if the target to be trapped is alive, the target is less likely to escape from the trap for use with a vacuum cleaner, with their legs being caught in the inner space of the protrusion. In particular, when the adhesive is also provided on the inner space of the protrusion, the target to be trapped is also entangled in the adhesive, such that the target is even less likely to escape from the trap for use with a vacuum cleaner.

In a preferred embodiment of the trap for use with a vacuum cleaner, at least one first recessed groove, extending axially and recessed radially inward, is formed near the insertion opening of the trap body. Thus, the first recessed groove has a recessed bottom surface to have a smaller width, such that the insertion opening has a reduced outer diameter, which allows the trap for use with a vacuum cleaner to be easily attached to and removed from the suction hose, during attachment of the trap for use with a vacuum cleaner to the suction hose of the vacuum cleaner.

In a preferred embodiment of the trap for use with a vacuum cleaner, at least one liquid leak prevention groove, extending circumferentially and bulging radially outward, is formed near the suction opening of the trap body. Thus, even if the trap for use with a vacuum cleaner is stored with the axial direction positioned vertically, the adhesive in the trap body does not drip down from the liquid leak prevention groove, which prevents the adhesive from leaking out of the trap body during storage.

In a preferred embodiment of the trap for use with a vacuum cleaner, at least one second recessed groove, extending axially and recessed radially inward, is formed near the suction opening of the trap body. Thus, when the vacuum cleaner sucks in the target to be trapped, and continues sucking with the suction opening blocked with an elastic ball as described below, the pressure inside the trap body drops to reduce the diameter of the trap body. This results in a reduced gap between the elastic ball and the inner surface of the trap body, which makes it even less likely for the target to be trapped that has been trapped to escape.

In a preferred embodiment of the trap for use with a vacuum cleaner, the trap body includes a cylindrical body portion with a substantially cylindrical shape including the suction opening; and a connection portion with a substantially cylindrical shape, the connection portion including a step connected to an end surface of the cylindrical body portion opposite to the suction opening, and a tapered portion with the insertion opening. The connection portion has the largest inner diameter at a coupling portion between the step and the tapered portion. The step gradually increases in inner diameter from the end surface connected to the cylindrical body portion toward the coupling portion. The tapered portion gradually decreases in outer diameter from the coupling portion toward the insertion opening. The protrusion extends from the cylindrical body portion to the step.

In this case, the suction hose of the vacuum cleaner can be connected to the tapered portion of the connection portion, which allows the trap for use with a vacuum cleaner to be used with vacuum cleaners having suction hoses with different inner diameters.

In a more preferred embodiment of the trap for use with a vacuum cleaner, the net portion is mounted to a portion of the tapered portion having an inner diameter larger than the inner diameter of the end surface of the step connected to the cylindrical body portion. The net has an area substantially equal to an area of the plane orthogonal to the axial direction of the end surface of the step connected to the cylindrical body portion.

In this case, the net portion is mounted to the inside of the trap body, such that when the user removes the trap for use with a vacuum cleaner from the suction hose of the vacuum cleaner, the user does not touch the target to be trapped that is trapped in the net portion. Moreover, the net portion is mounted to a portion of the tapered portion having an inner diameter larger than the inner diameter of the cylindrical body portion, which allows the target to be trapped to be trapped in a wider region. Furthermore, the net has an area substantially equal to the area of the plane orthogonal to the axial direction of the cylindrical body portion, such that the net can pass a sufficient amount of air sucked in through the suction opening. This prevents the net portion from narrowing the inner diameter of the inner space and reducing the suction force of the vacuum cleaner, leading to increased suction efficiency of the vacuum cleaner.

In a preferred embodiment of the trap for use with a vacuum cleaner, the suction opening is formed to at least partially incline at an acute angle of inclination with respect to the axis of the trap body. In this case, the suction opening has an increased length, compared to when the suction opening is formed at a right angle with respect to the axial direction, such that the suction opening can suck a larger target to be trapped. Furthermore, the suction opening with such an angle of inclination allows not only a pest on a floor surface, but also a pest stopping on a wall surface, for example, to be easily sucked in.

In a preferred embodiment of the trap for use with a vacuum cleaner, the trap body near the suction opening increases in diameter toward the suction opening. This results in an increased length of the suction opening, which allows a moving target to be trapped or a larger target to be trapped to be easily sucked.

A preferred embodiment of the trap for use with a vacuum cleaner comprises at least one elastic ball that can be inserted through the suction opening. The plane orthogonal to the axial direction of the trap body is blocked by all of the elastic balls of the trap for use with a vacuum cleaner being sucked through the suction opening into the trap body.

In this case, the elastic balls are sucked by the vacuum cleaner attached to the insertion opening to be held inside the trap body, which can prevent the target to be trapped from exiting out.

In a preferred embodiment of the trap for use with a vacuum cleaner, the protrusion has a hook extending along the axial direction of the trap body toward the insertion opening. The hook has a gap between the hook and the outer surface of the trap body. In this case, the trap for use with a vacuum cleaner can be more easily removed from the suction hose of the vacuum cleaner, by applying an external force to the hook that forms a part of the protrusion.

In a preferred embodiment of the trap for use with a vacuum cleaner, the trap body includes a first body and a second body. The first body and the second body have a shape in which the trap body is divided into two equal parts along the axial direction. The first body and the second body are connected by a hinge to be openable and closable. Upon closing of the first body and the second body, the net portion is sandwiched and mounted between the first body and the second body, and upon opening of the first body and the second body, the net portion is detachable.

In this case, the net portion is sandwiched and mounted between the first body and the second body, which facilitates mounting of the net portion. Moreover, the net portion is detachable upon opening of the first body and the second body, which facilitates replacement of the net portion.

In a preferred embodiment of the trap for use with a vacuum cleaner, the hinge is formed on the protrusion. Contact portions where the first body and the second body are brought in contact with each other are joined, and the contact portions are at least partially closed by a joining member.

In this case, the trap body is formed of a single continuous member, leading to a reduction in component costs. Moreover, the contact portions are at least partially closed by a joining member, which prevents the sucked target to be trapped from exiting out.

In a preferred embodiment of the trap for use with a vacuum cleaner, the first body includes, on an entire circumferential end surface, an integral covering that covers a circumferential end of the second body. This creates irregularities on the connection between the trap for use with a vacuum cleaner and the suction hose, which increases the frictional force, and makes it less likely for the trap for use with a vacuum cleaner to detach from the suction hose.

Advantageous Effects of Invention

The trap for use with a vacuum cleaner of the present invention, after sucking a target to be trapped by the vacuum cleaner, is easily removable from a vacuum cleaner attachment portion, and can prevent the target to be trapped from escaping.

BRIEF DESCRIPTION OF DRAWINGS

FIG. 2 is a perspective view of the trap for use with a vacuum cleaner in FIG. 1.

FIGS. 3(a), (b), and (c) are perspective views showing the net portion of the trap for use with a vacuum cleaner in FIG. 1; FIG. 3(a) is an exploded view of the net portion; FIG. 3(b) is an assembled view of the net portion; and FIG. 3(c) is a diagram showing the net portion 3 as being mounted to the trap for use with a vacuum cleaner.

FIG. 4 is a perspective view of the trap for use with a vacuum cleaner in FIG. 1, in a position rotated 180° with respect to FIG. 2.

FIGS. 5(a), (b), and (c) are diagrams showing the trap for use with a vacuum cleaner in FIG. 1 as being used to trap a target to be trapped; FIG. 5(a) is a cross-sectional view; FIG. 5(b) is a view along the arrow B in FIG. 5(a); and FIG. 5(c) is a view along the arrow C in FIG. 5(a).

FIG. 6 is a cross-sectional view showing the trap for use with a vacuum cleaner in FIG. 1 as having trapped a target to be trapped and then sucked the elastic ball to block the suction opening.

FIG. 7(a) shows the trap for use with a vacuum cleaner in use; FIG. 7(c) shows the trap for use with a vacuum cleaner as having been removed from the vacuum cleaner attachment portion and falling into a dust bin (not shown) or the like.

FIG. 8(a) shows a vacuum cleaner attachment portion with the largest attachable diameter as being attached to the connection portion.

FIG. 9(a) is a plan view.

FIG. 12(a) is an exploded view of the net portion.

DESCRIPTION OF EMBODIMENTS

Embodiments of the present invention will be hereinafter described with reference to the accompanying drawings. Examples of targets to be trapped that can be trapped by the trap for use with a vacuum cleaner of the present invention include, but are not limited to, pests, such as cockroaches, flies, mosquitoes, bees, horseflies, moths, ants, termites, spiders, centipedes, and stink bugs. Besides the pests, the targets also include insects, such as beetles.

First Embodiment

With reference to FIGS. 1 to 9 first, a trap 1 for use with a vacuum cleaner according to a first embodiment of the present invention is described.

<Structure of Trap 1 for Use with Vacuum Cleaner>

Figure 1:
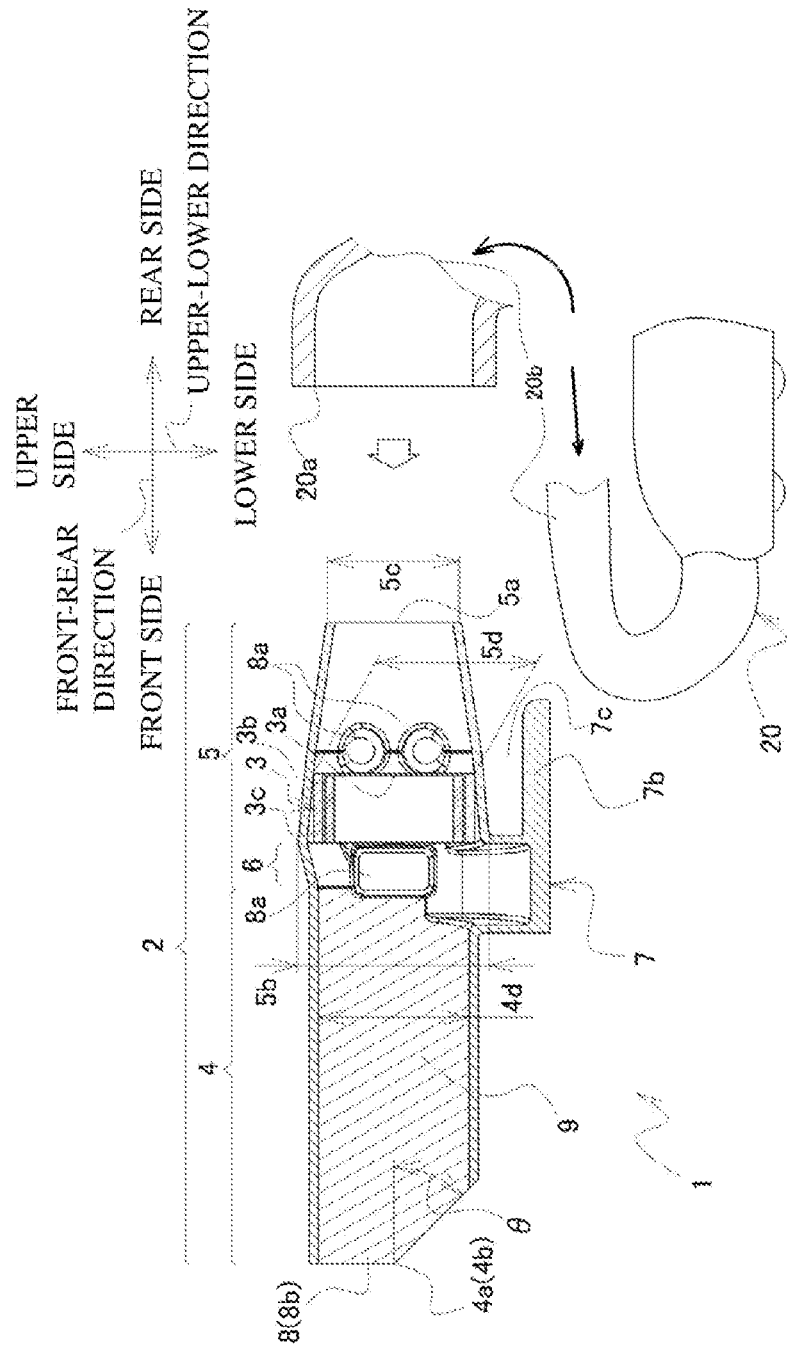
FIG. 1 is a longitudinal cross-sectional view of a trap for use with a vacuum cleaner according to a first embodiment of the present invention.

With reference to FIGS. 1, 2, and 4 first, an overall structure of the trap 1 for use with a vacuum cleaner is described. The trap 1 for use with a vacuum cleaner is detachably attached to a suction hose 20b of a vacuum cleaner 20 to trap a target to be trapped 30 by utilizing a suction force of the vacuum cleaner 20.

The trap 1 for use with a vacuum cleaner includes a trap body 2 and a net portion 3 mounted to the trap body 2.

The trap body 2 is formed in a substantially cylindrical shape with a predetermined length. The trap body 2 includes a suction opening 4a formed at one end to suck in the target to be trapped 30 and an insertion opening 5a formed at the other end to be inserted into the suction hose 20b of the vacuum cleaner 20. A cross section orthogonal to an axial direction of the trap body 2 may have any shape, such as circular, oval, or polygonal. The insertion opening 5a preferably has a shape that matches the shape of a vacuum cleaner attachment portion 20a at a tip of the suction hose 20b of the vacuum cleaner 20 to be used. The trap body 2 has a length of, for example, 50 to 300 mm, preferably 80 to 250 mm.

Hereinafter, the direction connecting the suction opening 4a and the insertion opening 5a is defined as the front-rear direction (also referred to as the axial direction); and the side toward the suction opening 4a is defined as the front side, and the side toward the insertion opening 5a is defined as the rear side. In the position as shown in FIG. 1, the upper-lower direction in FIG. 1 is defined as the upper-lower direction. The direction orthogonal to the upper-lower direction and the front-rear direction is defined as the left-right direction. FIGS. 1, 5, 6, and 8 each show a cross-sectional view of the trap 1 for use with a vacuum cleaner taken along the front-rear direction.

Specifically, the trap body 2 includes a cylindrical body portion 4 with a substantially cylindrical shape having the suction opening 4a; and a connection portion 5 with a substantially cylindrical shape having the insertion opening 5a. An end surface of the cylindrical body portion 4 opposite to the suction opening 4a is connected to an end surface of the connection portion 5 opposite to the insertion opening 5a.

As shown in FIG. 5(a), an end 4b of the suction opening 4a of the cylindrical body portion 4 is formed to at least partially incline at an acute angle of inclination θ with respect to the axis (front-rear direction) of the trap body 2. As shown in FIG. 5(b), the suction opening 4a has an opening length 14a as viewed in the direction inclined at the angle of inclination θ (view along the arrow B). As shown in FIG. 5(c), the suction opening 4a has an opening length 14b as viewed in the direction orthogonal to the front-rear direction (view along the arrow C). The opening length 14a is larger than the opening length 14b.

FIG. 5(a) shows an example in which the suction opening 4a is slanted such that the angle of inclination θ is about 45 degrees. The difference between the opening length 14a and the opening length 14b increases as the angle of inclination θ decreases. The opening length 14b (diameter) of the cylindrical body portion 4 is not limited as long as it can trap the target to be trapped 30, and is, for example, 20 to 40 mm, and preferably 30 mm. The opening length 14a of the cylindrical body portion 4 is not limited as long as it can trap the target to be trapped 30, and is, for example, 30 to 60 mm, and preferably 45 mm.

The connection portion 5 includes a step 6 connected to the end surface of the cylindrical body portion 4 opposite to the suction opening 4a, and a tapered portion with the insertion opening 5a. The connection portion 5 has the largest inner diameter at a coupling portion between the step 6 and the tapered portion. The step 6 gradually increases in inner diameter from the end surface connected to the cylindrical body portion 4 toward the coupling portion. That is, the inner diameter of the step 6 is at least partially larger than the inner diameter of the cylindrical body portion 4. The connection portion 5 gradually decreases in outer diameter from the coupling portion toward the insertion opening 5a. That is, a first outer circumferential length 5b having the largest circumferential length in the step 6 is larger than a second outer circumferential length 5c at the insertion opening 5a. The insertion opening 5a has an outer diameter of about 29 mm, for example. This is determined according to the dimension of the vacuum cleaner attachment portion 20a of the vacuum cleaner 20 available in the market.

An outer circumferential surface of the tapered portion of the connection portion 5 may be processed to increase the frictional coefficient to prevent easy removal of the vacuum cleaner attachment portion 20a during the attachment. For example, small irregularities may be provided on the surface of the tapered portion of the connection portion 5, or a material with a high frictional coefficient may be applied to the outer circumferential surface of the tapered portion of the connection portion 5. Alternatively, the entire connection portion 5 may be formed of a material with a high frictional coefficient, such as rubber.

The trap body 2 includes, in an axially central portion, a protrusion 7 formed on at least a portion in a circumferential direction of an outer surface thereof to protrude outward. In the first embodiment, the protrusion 7 is positioned on the lower sides of the step 6 and a portion of the cylindrical body portion 4 of the trap body 2. The position of the protrusion 7 is not limited; for example, the protrusion 7 may be provided in any position on the lower side, upper side, or right or left side of the trap body 2. Alternatively, the protrusion 7 may be provided on the lower and upper sides, on the left and right sides, or around the entire outer circumference of the trap body 2. When the protrusion 7 is provided around the entire outer circumference of the trap body 2, the protrusion 7 is also referred to as a flange 7.

The protrusion 7 is provided for the purpose of allowing the user to remove the trap 1 for use with a vacuum cleaner from the vacuum cleaner 20 without touching it with the user's hand. The protrusion 7 partially has a hook 7b extending along the front-rear direction (axial direction) toward the insertion opening 5a. The hook 7b has a gap 7c between the hook 7b and the outer surface of the trap body 2. As shown in FIG. 1 and the like, the hook 7b extends from a lower end of the protrusion 7 toward the rear side of the front-rear direction, i.e., toward the insertion opening 5a, or the vacuum cleaner attachment portion 20a.

As shown in FIG. 5 and the like, the gap 7c is provided to allow a portion of the vacuum cleaner attachment portion 20a to be inserted therein, and allow an end of a dust bin or a member for applying an external force (such as a member to be hooked, for example, a bar) to be inserted into the gap 7c. As shown in FIG. 4, the hook 7b also has hook ribs 7d formed on the left and right sides to protrude in a width direction. The hook ribs 7d are formed across substantially the entire length of the hook 7b formed in the front-rear direction.

Inside the trap body 2, i.e., inside the cylindrical body portion 4 and the connection portion 5, is formed an inner space 8 extending from the suction opening 4a to the insertion opening 5a. The protrusion 7 also has a hollow inside, and the inner space 8 of the protrusion 7 communicates with the inner space 8 of the trap body 2, i.e., the inner space 8 of the cylindrical body portion 4 and the connection portion 5. The inner space 8 is formed for the purpose of holding the target to be trapped 30 sucked through the suction opening 4a inside the trap 1 for use with a vacuum cleaner.

An adhesive 9 is provided on at least a portion of an inner surface (inner circumferential wall) 8b that forms the inner space 8. The adhesive 9 may be provided over the entire inner surface 8b, or may be disposed in a limited region, such as on a portion of the cylindrical body portion 4. The adhesive 9 is preferably provided at least on the inner surface that forms the inner space 8 of the protrusion 7.

The adhesive 9 may be of a type that is directly applied to the inner surface 8b, or may be of a type in which a double-faced adhesive tape 9b is attached. The adhesive 9 may have a surface coated with a release member (not shown), or may have an exposed surface. When the surface of the adhesive 9 is coated with a release member, the release member needs to be removed either during the manufacture process or by the user before use, as described below. When the surface of the adhesive 9 is not coated with a release member, the adhesive 9 may have reduced adhesion due to drying. This may be prevented by, for example, selecting an adhesive 9 that maintains a certain degree of adhesion even if it dries, or by designing the trap 1 for use with a vacuum cleaner such that it is maintained in a sealed state during shipment from the factory and opened by the user at the time of use.

The trap body 2 includes, in the inner space 8, engagement portions 8a that engage the net portion 3 between the front and rear sides. The net portion 3 is engaged by the engagement portions 8a to block the plane orthogonal to the axial direction of the trap body 2.

As shown in FIG. 3, the net portion 3 includes a net 3a formed in at least a portion to transmit air sucked in through the suction opening 4a. Specifically, the net portion 3 includes the net 3a, a cylindrical outer frame 3b, and a cylindrical inner frame 3c.

The outer frame 3b has an outer shape that is substantially equal to a cross section orthogonal to the axial direction of the inner space 8 at the position where the net portion 3 is mounted. The inner frame 3c has an outer shape that has a gap into which the net 3a is inserted and that fits into the outer frame 3b. The outer frame 3b and the inner frame 3c have a length in the front-rear direction that fits between the engagement portions 8a.

The net 3a is formed of a sheet-shaped member made of a metal, a resin, a nonwoven fabric, or other material. While the net 3a may have a color selected from various colors, it preferably has a black color. When the net 3a has a black color, the visibility of the inner space 8 is improved, which allows the user to easily see whether the target to be trapped 30 has been trapped. The target to be trapped 30 can be seen by looking into the inner space 8 from the insertion opening 5a of the connection portion 5 with light directed into the inner space 8. The coarseness of the mesh of the net 3a can be selected according to the size of the target to be trapped 30.

The net portion 3 is formed by folding the outer edge of the net 3a to wrap around the outer side of the inner frame 3c, and fitting the resultant structure into the inner side of the outer frame 3b. FIG. 3(b) shows the net portion 3 in an assembled state, and FIG. 3(c) shows the net portion 3 as being mounted to the trap body 2 (here, the net portion 3 is indicated by the phantom line). At this time, the net 3a preferably has an area substantially equal to an area of the plane orthogonal to the axial direction of the end surface connected to the cylindrical body portion 4. As shown in FIG. 1, the assembled net portion 3 is mounted such that the net 3a is positioned on the rear side of the front-rear direction, i.e., toward the insertion opening 5a, in the connection portion 5.

The net portion 3 may have a structure other than the structure using the outer frame 3b and the inner frame 3c, for example, a structure in which the net 3a is fixed to the outer frame 3b with an adhesive or the like.

As shown in FIG. 1, the engagement portions 8a are formed in the connection portion 5 including the step 6. The portion of the connection portion 5 to which the net portion 3 is mounted has an inner diameter 5d larger than an inner diameter 4d of the connected portion where the cylindrical body portion 4 and the connection portion 5 are connected. That is, the net portion 3 is mounted to the portion having the inner diameter 5d larger than the inner diameter 4d of the end surface of the step 6 connected to the cylindrical body portion 4, in the connection portion 5. Thus, the net portion 3 can block the plane orthogonal to the axial direction of the trap body 2 in a region wider than the inner diameter 4d of the cylindrical body portion 4.

As shown in FIG. 3(c), the front engagement portion 8a has a prism shape, and the rear engagement portion 8a has a column shape. The shapes of the engagement portions 8a are not limited to these shapes, and may be any shapes that can sandwich the net portion 3 therebetween. For example, the engagement portions 8a may be provided by forming steps on the inner surface 8b of the inner space 8. Alternatively, the engagement portions 8a may be provided by forming recesses into which the net portion 3 fits, in the inner surface 8b. Preferably, the engagement portions 8a have projections or steps that engage with the inner frame 3c and the outer frame 3b of the net portion 3, and particularly the front engagement portion 8a has a degree of protrusion or a step that does not block the net 3a. This is intended to prevent the engagement portions 8a from reducing the negative pressure developed through the net portion 3 during sucking by the vacuum cleaner 20.

The net portion 3 is sandwiched and fixed between the engagement portions 8a, such that it is stably fixed without moving in the front-rear direction. The net portion 3 may be fixed by press-fitting between the engagement portions 8a, or may be fixed by bonding the outer frame 3b and the inner surface 8b.

As shown in FIG. 6, the trap 1 for use with a vacuum cleaner may include an elastic ball 11 that can be inserted through the suction opening 4a. The elastic ball 11 is sucked by the vacuum cleaner 20 attached to the insertion opening 5a to be held inside the inner space 8. Specifically, the elastic ball 11 is held more toward the front side than the net portion 3 in the inner space 8. The number of the elastic balls is not limited, and may be one, or two or more.

The elastic ball 11 is formed of a sponge, rubber, felt, or other elastic material. The size, shape, hardness (elasticity), and the like of the elastic ball 11 are not limited as long as the elastic ball 11 can be inserted into the suction opening 4a. It is only required that the plane orthogonal to the axial direction of the trap body 2 be blocked when all of the elastic balls 11 of the trap 1 for use with a vacuum cleaner are sucked through the suction opening 4a into the trap body 2. For example, when the trap 1 for use with a vacuum cleaner includes one elastic ball 11, the one elastic ball 11 is preferably sized to have a diameter larger than the diameter of the inner surface 8b of the cylindrical body portion 4, and elastically deform to be held in the inner surface 8b when sucked in through the suction opening 4a. When the trap 1 for use with a vacuum cleaner includes two or more elastic balls 11, each one of the elastic balls 11 may have a diameter smaller than the diameter of the inner surface 8b of the cylindrical body portion 4, as long as the plurality of elastic balls 11 together block the plane orthogonal to the axial direction of the inner surface 8b.

<Structure of Trap Body 2>

Figures 9A, 9B:
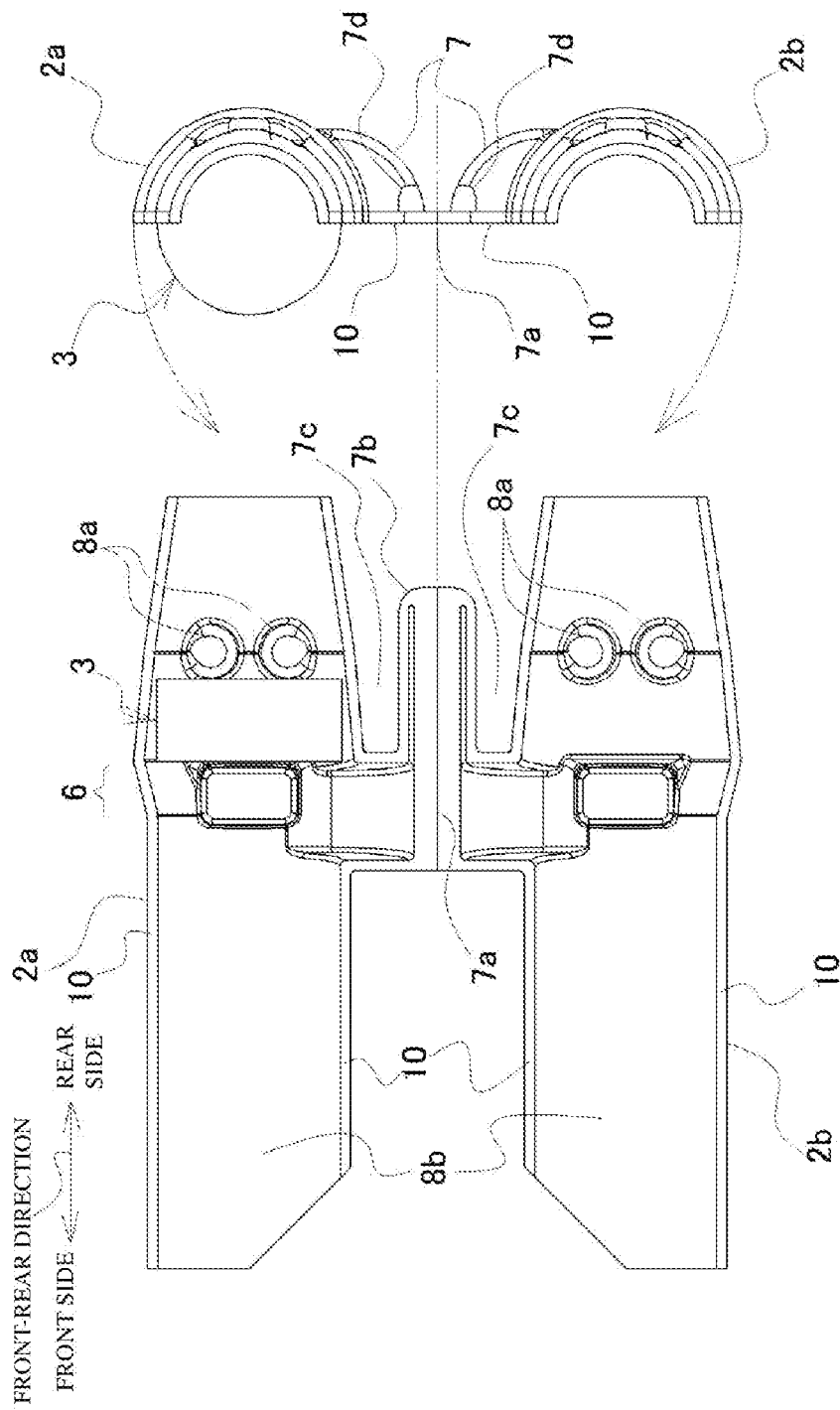
FIGS. 9(a) and (b) are diagrams of the trap body of the trap for use with a vacuum cleaner in FIG. 1 in an open state.
FIG. 9(b) is a side view.

Now with reference to FIG. 9, an exemplary structure of the trap body 2 is more specifically described. The trap body 2 includes a first body 2a and a second body 2b. The first body 2a and the second body 2b have a shape in which the trap body 2 is divided into two equal parts along the front-rear direction (axial direction). That is, the first body 2a and the second body 2b have a symmetrical shape. The first body 2a and the second body 2b are connected by a hinge 7a to be openable and closable.

The hinge 7a is formed on the protrusion 7. The first body 2a and the second body 2b are opened 180° by the hinge 7a. Contact portions 10 where the first body 2a and the second body 2b are brought in contact with each other are flush with each other with the first body 2a and the second body 2b open 180°. When the first body 2a and the second body 2b are closed, the contact portions 10 are joined, and the inner space 8 is formed. The contact portions 10 are at least partially closed by a joining member 12 (see FIGS. 2 and 4). When all of the contact portions 10 are joined in a sealed state, the suction efficiency by the vacuum cleaner 20 is further improved.

The trap body 2 can be integrally molded by pulp molding or resin molding. Alternatively, the first body 2a, the second body 2b, and the hinge 7a may be provided as individual members, and the first body 2a and the second body 2b may be connected by the hinge 7a to provide a single continuous member.

The engagement portions 8a are formed in each of the first body 2a and the second body 2b. Upon closing of the first body 2a and the second body 2b, the inner space 8 is formed, and the net portion 3 is sandwiched and mounted between the first body 2a and the second body 2b. Upon opening of the first body 2a and the second body 2b, the net portion 3 is detachable.

The hook 7b is connected across both the first body 2a and the second body 2b, and the portion of the hook 7b on the first body 2a and the portion of the hook 7b on the second body 2b are mated with each other when folded by the hinge 7a. When the trap body 2 is manufactured by pulp molding or resin molding, the hook 7b is formed into a plate shape with a uniform thickness. The hook 7b has a doubled plate thickness upon mating of the portion on the first body 2a and the portion on the second body 2b by the hinge 7a, leading to an increased strength.

The trap body 2 can be produced using any of various materials. Examples of materials include paperboard such as cardboard, corrugated cardboard, resins, wood, rubber, and metals. In the case of pulp molding, for example, environmentally friendly materials, such as waste newspaper or waste corrugated cardboard, can be used. The material to be used can be selected appropriately from these materials. The material to be used for the outer frame 3b and the inner frame 3c of the net portion 3 can also be selected from the same various materials as those of the trap body 2.

When the trap body 2 is molded by pulp molding, the trap body 2 can achieve a weight reduction and a reduction in component costs, such that the trap 1 for use with a vacuum cleaner can be of a disposable type. Pulp molding is also environmentally friendly in that waste newspaper, waste corrugated cardboard, or the like can be used as the material.

When the trap body 2 is molded by resin molding, the trap body 2 can be reused by replacing the net portion 3 with a new one, because the trap body 2 is openable and closable by the hinge 7a. The adhesive 9 can be replaced with a new one, if an adhesive tape that can be peeled from the inner surface (inner circumferential wall) 8b is used as the adhesive 9.

It can be selected, as desired, whether the trap 1 for use with a vacuum cleaner is of a single-use disposable type or of a reusable type, including embodiments in which the trap 1 for use with a vacuum cleaner is formed of other materials.

<Method of Manufacturing Trap 1 for Use with Vacuum Cleaner>

Now with reference to FIG. 9, a method of manufacturing the trap 1 for use with a vacuum cleaner is described. First, the trap body 2 is placed with the first body 2a and the second body 2b open. The adhesive 9 is provided on the inner surface 8b of the first body 2a and the second body 2b. The adhesive 9 may be provided by directly applying a sticky material 9a to the inner surface (inner circumferential wall) 8b, or by attaching a double-faced adhesive tape 9b covered with a release member (not shown) to the inner surface (inner circumferential wall) 8b. When the double-faced adhesive tape 9b is used, the step of removing the release member is added after the double-faced adhesive tape 9b is attached to the inner surface 8b. As described below, when the trap body 2 is reused, the user may remove the release member before use.

Second, the net portion 3 is mounted between the engagement portions 8a on either of the first body 2a and the second body 2b. The net portion 3 may be fixed to the inner surface 8b by bonding with an adhesive or the like, or may be fixed by press-fitting between the engagement portions 8a. The net portion 3 is detachable when it is fixed to the inner surface 8b by a press-fit method. In this case, the trap body 2 can be reused by replacing the net portion 3 with a new one. The net portion 3 does not necessarily need to be fixed, because the net portion 3 is fixed upon closing of the first body 2a and the second body 2b.

Third, the first body 2a and the second body 2b are closed, and the contact portions 10 are joined by the joining member 12. As shown in FIGS. 2 and 4, the cylindrical body portion 4 is joined by winding an adhesive tape 12b around the hatched region (outer circumference), with the contact portions 10 brought in contact with each other. Additionally, as shown in FIG. 2, an adhesive tape 12a is attached over the entire regions of the upper sides of the contact portions 10 along the front-rear direction. As shown in FIG. 2, the regions to which the adhesive tape 12a is attached are uncurved flat portions 2c formed over the entire regions in the front-rear direction. By attaching the adhesive tape 12a to the flat portions 2c, lifting and the like of the adhesive tape 12a after being attached can be prevented. When the trap 1 for use with a vacuum cleaner is of a disposable type, an adhesive tape having relatively strong adhesion and less likely to peel off is selected as the adhesive tape 12a, 12b. When the trap 1 for use with a vacuum cleaner is to be reused, a releasable-type adhesive tape is used as the adhesive tape 12a, 12b.

Furthermore, although this is not shown in FIG. 4, the adhesive tape may also be attached to the contact portions 10 on the lower sides of the connection portion 5 and the protrusion 7 to join the contact portions 10. The portion of the hook 7b on the first body 2a and the portion of the hook 7b on the second body 2b may be bonded when the first body 2a and the second body 2b are mated with each other. While the foregoing has described the method of joining using the adhesive tape 12a, 12b, the joining method is not limited thereto, and other methods can also be used. For example, the joining may be accomplished using a hook-shaped catch or a magnet, or other joining methods may be used.

<Method of Using Trap for Use with Vacuum Cleaner>

Now with reference to FIGS. 1 to 6 and 8, a method of trapping the target to be trapped 30 using the trap 1 for use with a vacuum cleaner is described. With reference to FIGS. 8(a) to (c) first, how the connection portion 5 is attached to the vacuum cleaner attachment portion 20a is described. FIG. 8(a) shows the connection portion 5 as being attached to the vacuum cleaner attachment portion 20a with the largest attachable size. In this case, the connection portion 5 is attached into a position where the end of the vacuum cleaner attachment portion 20a contacts the protrusion 7. FIG. 8(b) shows the connection portion 5 as being attached to the vacuum cleaner attachment portion 20a with the smallest attachable size. In this case, the connection portion 5 is attached with the end of the vacuum cleaner attachment portion 20a in contact with an outer circumference of the tapered portion. FIG. 8(c) shows the case where the vacuum cleaner attachment portion 20a has a size between the sizes in FIGS. 8(a) and 8(b). The user attaches the trap 1 for use with a vacuum cleaner to the vacuum cleaner attachment portion 20a of the vacuum cleaner 20 in any of the manners shown in FIGS. 8(a) to (c), depending on the size of the vacuum cleaner attachment portion 20a of the user's vacuum cleaner 20 (see FIG. 1).

Then, as shown in FIG. 5, the user turns on the vacuum cleaner 20 to suck in the target to be trapped 30 through the suction opening 4a. The target to be trapped 30 is sucked in until it reaches the net portion 3, where the target is stuck to the adhesive 9 or stays in the net portion 3. Furthermore, as shown in FIG. 6, when the elastic ball 11 is sucked in through the suction opening 4a, the elastic ball 11 is held along the inner surface 8b. Even if the target to be trapped 30 is not stuck to the adhesive 9, the target does not escape out of the inner space 8 because it is held between the elastic ball 11 and the net portion 3.

Figure 7A:
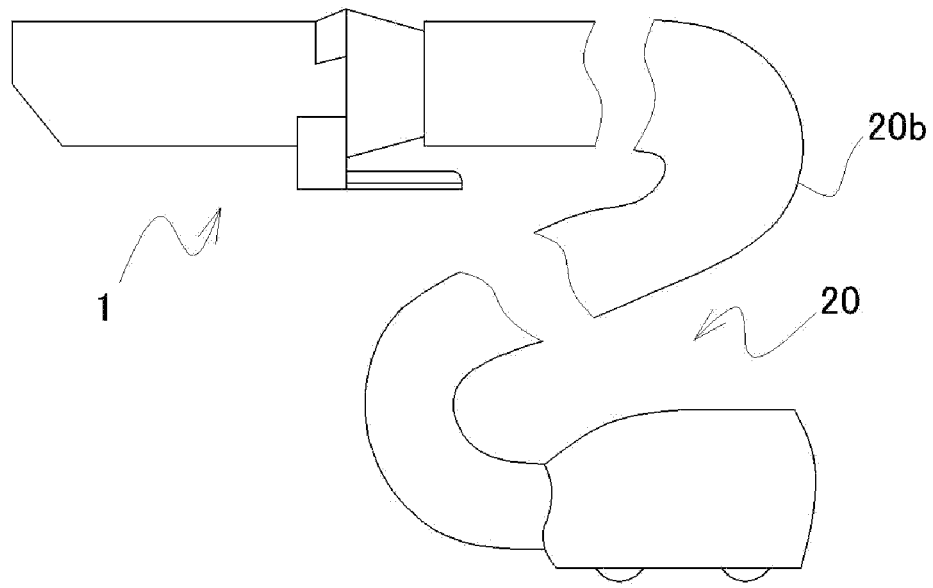
FIGS. 7(a), (b), and (c) are diagrams showing the process of removing the trap for use with a vacuum cleaner in FIG. 1 from the vacuum cleaner attachment portion.
Figure 7B:
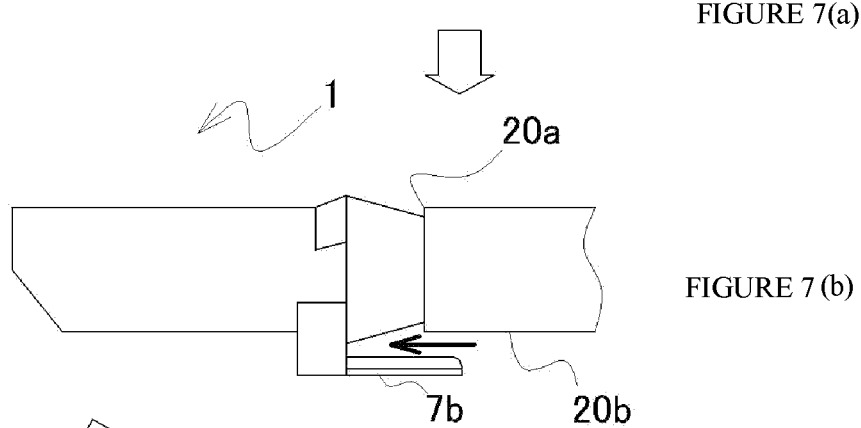
FIG. 7(b) shows an external force as being applied to the protrusion to remove the trap for use with a vacuum cleaner from the vacuum cleaner attachment portion.
Figure 7C:
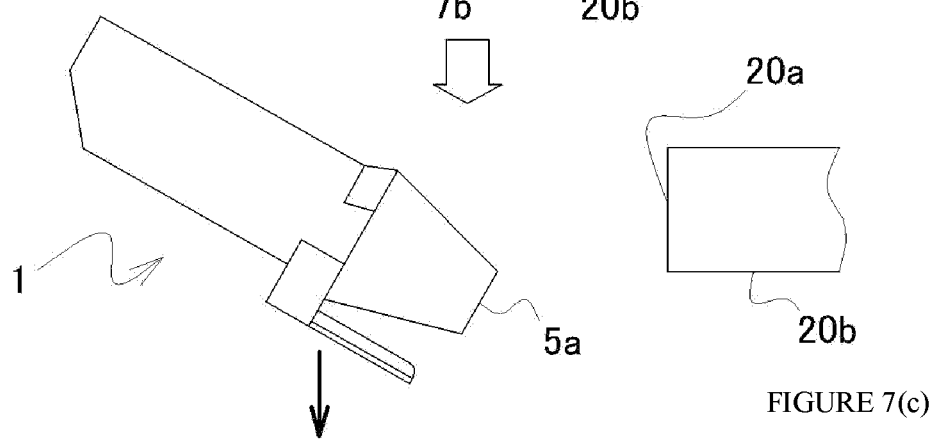

Now with reference to FIG. 7, a method of removing the trap 1 for use with a vacuum cleaner from the vacuum cleaner attachment portion 20a of the vacuum cleaner 20 is described. FIG. 7(a) shows the trap 1 for use with a vacuum cleaner as being attached to the vacuum cleaner attachment portion 20a. After use, by applying an external force in the direction of the arrow to the hook 7b of the protrusion 7 as shown in FIG. 7(b), the trap 1 for use with a vacuum cleaner can be removed from the vacuum cleaner attachment portion 20a.

For example, the user can apply an external force by hooking the hook 7b of the protrusion 7 on an edge of a dust bin to dispose of the trap 1 for use with a vacuum cleaner into the dust bin, without touching the trap 1 for use with a vacuum cleaner. See FIG. 7(c) (the dust bin is not shown). Alternatively, the user can push a pushing member (such as a bar or a like member) against the protrusion 7 or hook 7b to remove the trap 1 for use with a vacuum cleaner from the vacuum cleaner attachment portion 20a. In this manner, the user can dispose of the trap 1 for use with a vacuum cleaner into a dust bin or the like without directly touching the trap 1 for use with a vacuum cleaner with the user's hand.

Alternatively, the user can tap a portion of the vacuum cleaner 20 near the vacuum cleaner attachment portion 20a on the edge of a dust bin, such that the trap 1 for use with a vacuum cleaner falls into the dust bin to be removed. At this time, the protrusion 7 is preferably positioned on the lower side. The protrusion 7 causes the center of gravity of the trap 1 for use with a vacuum cleaner to be positioned on the lower side, which allows the trap 1 for use with a vacuum cleaner to fall naturally into the dust bin.

Second Embodiment

Figure 10:
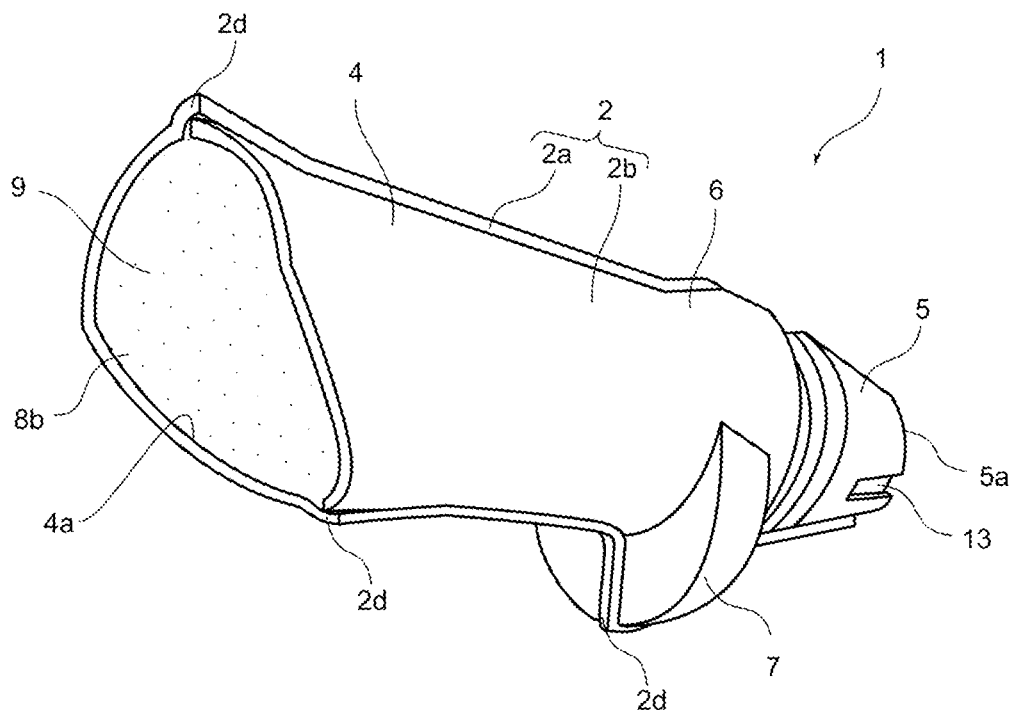
FIG. 10 is a perspective view showing a trap for use with a vacuum cleaner according to a second embodiment of the present invention.
Figure 11:
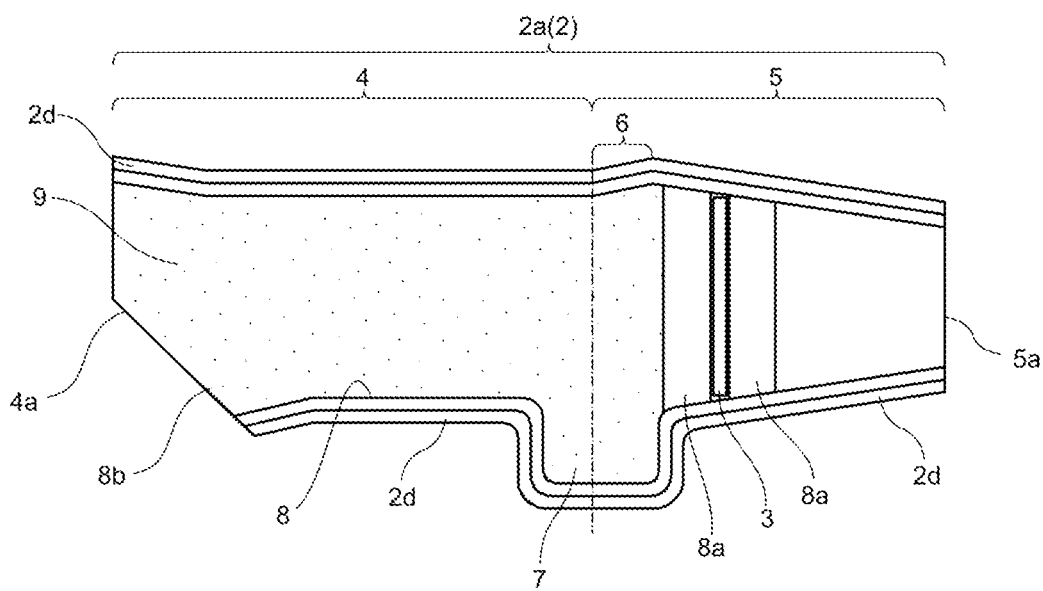
FIG. 11 is a right side view of the first body of the trap for use with a vacuum cleaner in FIG. 10.
Figure 12A:
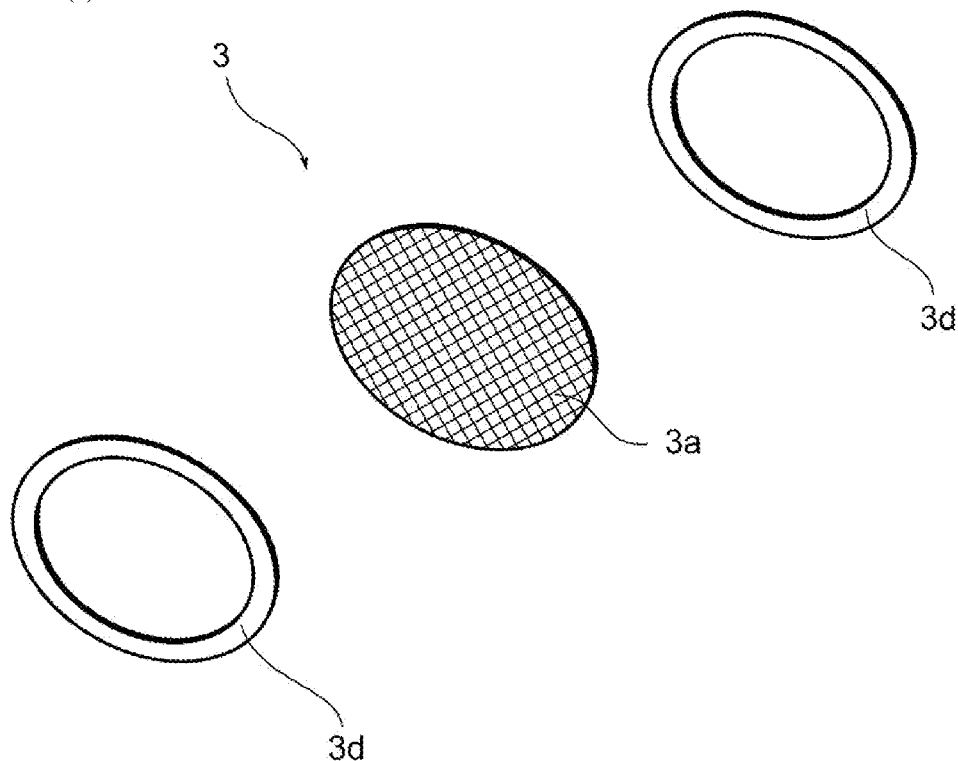
FIGS. 12(a) and (b) are diagrams showing the net portion to be mounted to the trap for use with a vacuum cleaner in FIG. 10.
Figure 12B:
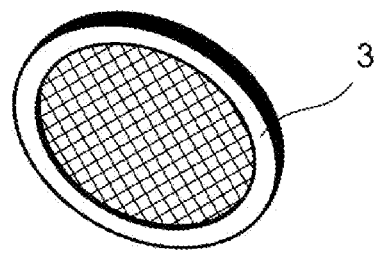
FIG. 12(b) is an assembled view of the net portion.

Now with reference to FIGS. 10 to 12, a trap 1 for use with a vacuum cleaner according to a second embodiment is described. In the second embodiment, elements identical to those of the first embodiment are labeled with identical reference numerals, and the description thereof is not repeated.

As shown in FIGS. 10 and 11, the first body 2a and the second body 2b are formed separately and independently. The first body 2a includes, on an entire circumferential end surface, an integral covering 2d formed to cover a circumferential end of the second body 2b. The covering 2d protrudes circumferentially from the circumferential end of the first body 2a and simultaneously, extends radially outward to a length corresponding to the thickness of the second body 2b. The first body 2a and the second body 2b are bonded by bonding an inner circumferential surface of the covering 2d and an outer circumferential surface of the circumferential end of the second body 2b with an adhesive. As a result, the trap body 2 is formed.

The cylindrical body portion 4 of the trap body 2 near the suction opening 4a increases in diameter toward the suction opening 4a.

At least one first recessed groove 13, extending axially and recessed radially inward, is formed near the insertion opening 5a of the trap body 2, i.e., in the connection portion 5. Specifically, the first recessed groove 13 is formed to extend in the front-rear direction (axial direction) from the insertion opening 5a. In the embodiment shown in FIG. 10, the first body 2a has a single first recessed groove 13 (not shown), and the second body 2b has a single first recessed groove 13. A plurality of first recessed grooves 13 may be provided in a circumferentially spaced manner.

The first recessed groove 13 may have any shape having a thickness smaller than the radial thickness of the connection portion 5, and may also have a shape that bulges inward. Alternatively, the first recessed groove 13 may be formed as a slit penetrating through to the inner space 8.

The protrusion 7 protrudes toward the lower side of the trap body 2. The protrusion 7 does not have a hook 7b as in the first embodiment.

The engagement portions 8a are formed by recessing an outer surface of the connection portion 5 radially inward across an entire circumference. In the engagement portions 8a, the diameter of the plane orthogonal to the axial direction of the trap body 2 at the position of the engagement portions 8a is preferably equal to or larger than the inner diameter of the end surface where the connection portion 5 is connected to the cylindrical body portion 4. The front engagement portion 8a and the rear engagement portion 8a are spaced apart by a distance that allows the net portion 3 to be sandwiched therebetween without a gap. The engagement portions 8a do not need to be formed across the entire circumference; instead, a plurality of engagement portions 8a may be formed circumferentially at a predetermined spacing. Alternatively, the engagement portions 8a may be formed as separate members, and may be configured to be mounted to the inner surface 8b of the trap body 2.

As shown in FIG. 12, the net portion 3 includes a net 3a formed of a nonwoven fabric and a pair of flat ring-shaped frames 3d for fixing the net 3a. The frames 3d have an outer diameter that can engage with the engagement portions 8a and can be accommodated in the inner space 8 of the connection portion 5. The frames 3d have an inner diameter equal to or larger than the inner diameter of the engagement portions 8a. The frames 3d are preferably formed using coated cardboard, for example. When the net 3a is formed of a nonwoven fabric, the frames 3d are formed of coated cardboard, and the trap body 2 is formed by pulp molding, the trap 1 for use with a vacuum cleaner has an environmentally friendly structure without the need to care about sorting and the like for disposal of the trap 1 for use with a vacuum cleaner after use.

Third Embodiment

Figure 13:
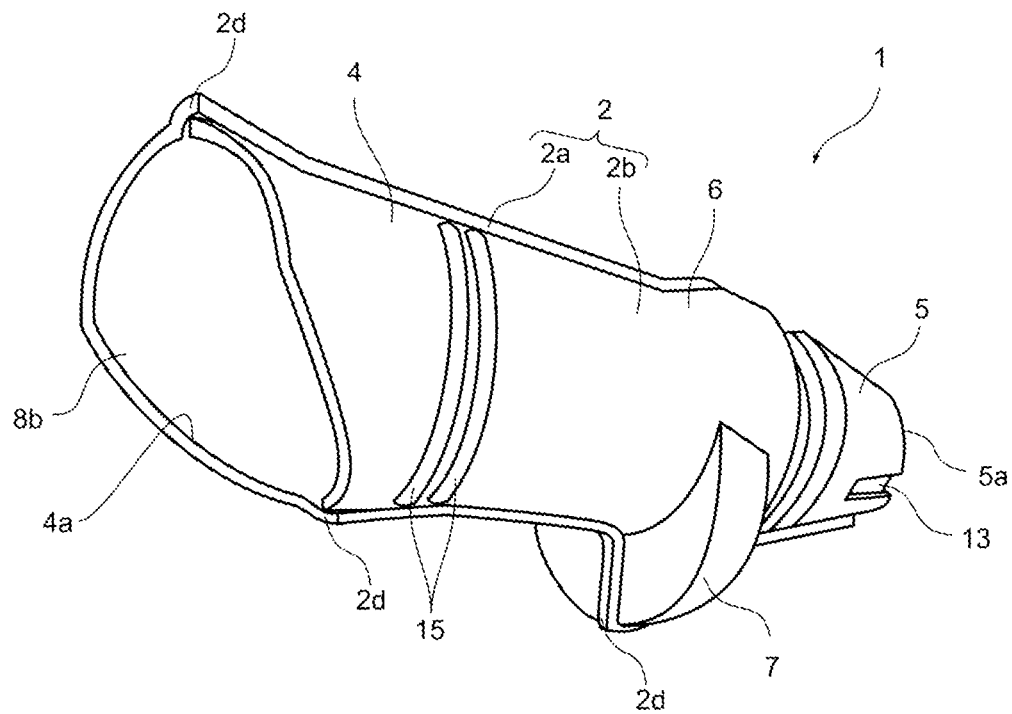
FIG. 13 is a perspective view showing a trap for use with a vacuum cleaner according to a third embodiment of the present invention.
Figure 14:
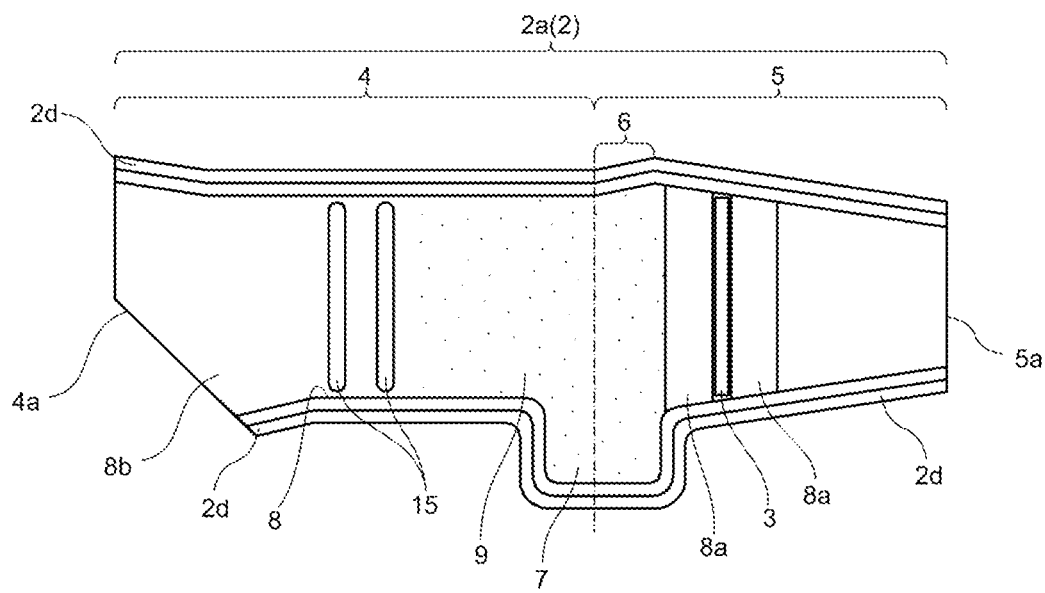
FIG. 14 is a right side view of the first body of the trap for use with a vacuum cleaner in FIG. 13.

Now with reference to FIGS. 13 and 14, a trap 1 for use with a vacuum cleaner according to a third embodiment is described. In the third embodiment, elements identical to those of the second embodiment are labeled with identical reference numerals, and the description thereof is not repeated.

On an inner circumferential surface of the first body 2a and the second body 2b, at least one liquid leak prevention groove 15, which bulges radially outward, is formed near the suction opening 4a of the trap body 2, and more specifically near the center of the cylindrical body portion 4 in the front-rear direction. The liquid leak prevention groove 15 is formed to extend circumferentially from one circumferential end surface of each of the first body 2a and the second body 2b to the other circumferential end surface. In the embodiment shown in FIGS. 13 and 14, two liquid leak prevention grooves 15 are spaced in the front-rear direction. The number of the liquid leak prevention grooves 15 is not limited to two, and may be any (such as one, or three or more).

The adhesive 9 is applied to a portion that is more toward the rear side than the liquid leak prevention grooves 15 and more toward the front side than the net portion 3, and is also applied to the inner surface that forms the inner space 8 of the protrusion 7.

Fourth Embodiment

Figure 15:
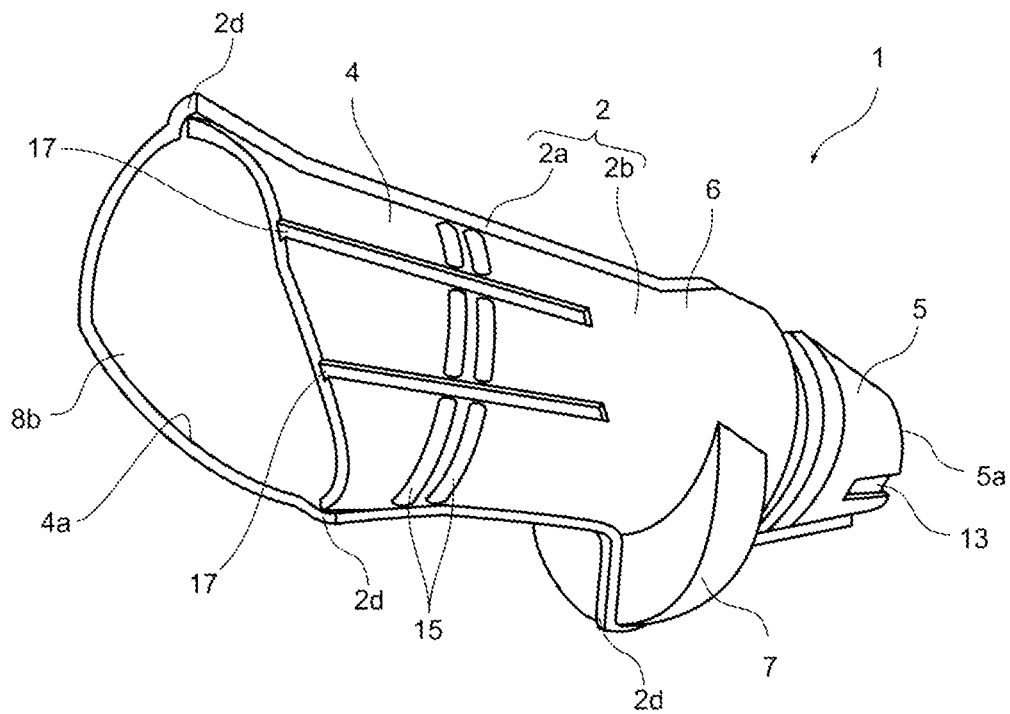
FIG. 15 is a perspective view showing a trap for use with a vacuum cleaner according to a fourth embodiment of the present invention.
Figure 16:
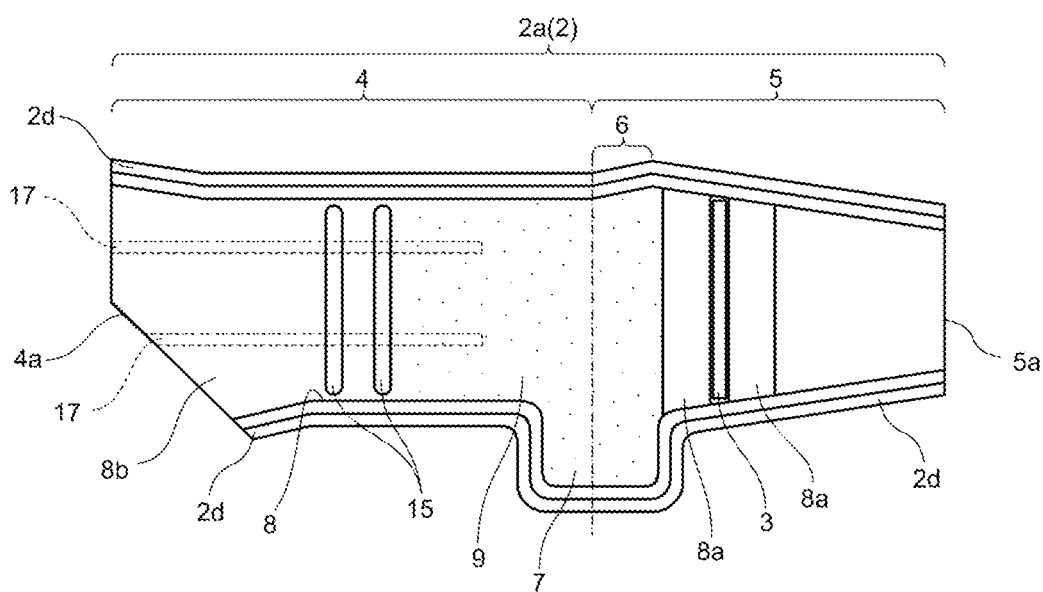
FIG. 16 is a right side view of the first body of the trap for use with a vacuum cleaner in FIG. 15.

Now with reference to FIGS. 15 and 16, a trap 1 for use with a vacuum cleaner according to a fourth embodiment is described. In the fourth embodiment, elements identical to those of the second and third embodiments are labeled with identical reference numerals, and the description thereof is not repeated.

At least one second recessed groove 17, extending axially and recessed radially inward, is formed near the suction opening 4a of the trap body 2, i.e., in the cylindrical body portion 4. Specifically, the second recessed groove 17 is formed to extend in the front-rear direction (axial direction) across the entire cylindrical body portion 4 from the suction opening 4a. In the embodiment shown in FIG. 15, the first body 2a has two second recessed grooves 17 (not shown), and the second body 2b has two second recessed grooves 17. The number of the second recessed grooves 17 may be any, such as one, or three or more, for each of the first body 2a and the second body 2b.

The second recessed grooves 17 may have any shape having a thickness smaller than the radial thickness of the cylindrical body portion 4, and may have a shape that bulges inward. Alternatively, the second recessed grooves 17 may be formed as slits penetrating through to the inner space 8.

<Problems Solved by and Effects Attained by Trap for Use with Vacuum Cleaner>

The trap 1 for use with a vacuum cleaner described above solves various problems and attains various effects. The conventional trap for use with a vacuum cleaner has the problem of not being easily removable from the vacuum cleaner attachment portion of the vacuum cleaner. Moreover, the user needs to directly touch the entrance portion to remove the trap for use with a vacuum cleaner, such that the user may touch the target to be trapped that has been trapped. Furthermore, during disposal of the target to be trapped that has been trapped by the trap for use with a vacuum cleaner, the target to be trapped may escape out of the entrance portion. The trap 1 for use with a vacuum cleaner according to the present invention solves these problems.

As shown in FIG. 1 and the like, the trap 1 for use with a vacuum cleaner of the present invention includes the protrusion (flange) 7 protruding from at least a portion in the circumferential direction of the outer surface. This allows the trap 1 for use with a vacuum cleaner to be easily removed from the vacuum cleaner attachment portion 20a, by applying an external force to the protrusion 7. As shown in FIG. 7, for example, the user can apply an external force by hooking the protrusion 7 on a dust bin or the like to easily remove the trap 1 for use with a vacuum cleaner from the vacuum cleaner attachment portion 20a for direct disposal into the dust bin or the like. Alternatively, the user can hook the user's hand directly on the protrusion 7 to easily remove the trap 1 for use with a vacuum cleaner from the vacuum cleaner attachment portion 20a. In this case also, the user only touches the protrusion (flange) 7, without touching the target to be trapped 30 that is trapped in the inner space 8 of the trap 1 for use with a vacuum cleaner.

The net portion 3 is provided in the inner space 8 of the trap body 2 to block the plane orthogonal to the front-rear direction. Thus, the target to be trapped 30 sucked in through the suction opening 4a is caused to stay in the inner space 8. Thus, when the user removes the trap 1 for use with a vacuum cleaner from the vacuum cleaner attachment portion 20a of the vacuum cleaner 20, the user does not touch the target to be trapped 30 that is trapped in the net portion 3.

Moreover, the protrusion 7 of the trap 1 for use with a vacuum cleaner is required to have a shape that allows easier removal from the vacuum cleaner attachment portion 20a. As a solution to this, on the protrusion 7 of the first embodiment is formed the hook 7b extending along the front-rear direction of the trap body 2 toward the insertion opening 5a, and the gap 7c is formed between the hook 7b and the outer surface of the trap body 2. Thus, the trap 1 for use with a vacuum cleaner can be more easily removed from the vacuum cleaner attachment portion 20a, by applying an external force to the hook 7b that forms a part of the protrusion (flange) 7. Furthermore, the hook 7b has the hook ribs 7d formed on the left and right sides to protrude in the width direction. This increases the rigidity of the hook 7b, which can reduce deformation due to the application of an external force to the hook 7b.

Furthermore, in the trap 1 for use with a vacuum cleaner of each of the second to fourth embodiments, the first recessed groove 13 or a slit is formed in the connection portion 5. Thus, the first recessed groove 13 has a recessed bottom to have a smaller width, or the slit is narrowed to have a smaller width, such that the insertion opening 5a has a reduced outer diameter, which allows the trap 1 for use with a vacuum cleaner to be easily attached to and removed from the vacuum cleaner attachment portion 20a, during attachment and removal of the trap 1 for use with a vacuum cleaner to and from the vacuum cleaner attachment portion 20a.

Furthermore, in the trap 1 for use with a vacuum cleaner according to each of the second to fourth embodiments, the first body 2a includes, on an entire circumferential end surface, the integral covering 2d that covers a circumferential end of the second body 2b. This creates irregularities on the connection between the trap 1 for use with a vacuum cleaner and the vacuum cleaner attachment portion 20a, which increases the frictional force, and makes it less likely for the trap 1 for use with a vacuum cleaner when in use to detach from the vacuum cleaner attachment portion 20a.

There is a problem to be solved by the trap 1 for use with a vacuum cleaner that the target to be trapped 30 sucked through the suction opening 4a should stay in the inner space 8 and not be sucked into the vacuum cleaner 20. If the target to be trapped 30 is sucked into the vacuum cleaner 20, the target to be trapped 30 may decompose in the vacuum cleaner 20, possibly leading to adverse effects, such as generation of a bad smell and development of bacteria. It is also required to prevent the net portion 3 from moving in the inner space 8, such that the target to be trapped 30 that has been trapped does not move to the insertion opening 5a and into the vacuum cleaner 20. The trap 1 for use with a vacuum cleaner according to the present invention solves this problem.

The net portion 3 is engaged by the engagement portions 8a between the front and rear sides to be fixed and unmovable in the inner space 8. Thus, the net portion 3 restricts the target to be trapped 30 sucked in through the suction opening 4a from moving in the inner space 8, which can prevent the target to be trapped 30 from being sucked into the vacuum cleaner 20.

Furthermore, in the trap 1 for use with a vacuum cleaner of the first embodiment, the net portion 3 is mounted such that the net 3a is positioned on the rear side of the front-rear direction, i.e., toward the insertion opening 5a, in the connection portion 5. Thus, the target to be trapped 30 sucked in through the suction opening 4a stays inside the inner frame 3c of the net portion 3. When the trap 1 for use with a vacuum cleaner is reused, the target to be trapped 30 can be collected simultaneously with replacement of the net portion 3. For example, when the surface of the net 3a is coated with an adhesive for the net (not shown), the target to be trapped 30 is more likely to stay in the net portion 3.

The net portion 3 is mounted to a portion of the tapered portion of the connection portion 5 having an inner diameter larger than the inner diameter of the cylindrical body portion 4. Thus, the net portion 3 can block the inner space 8 in a region wider than the inner diameter of the cylindrical body portion 4.

A further problem is that the vacuum cleaner attachment portion 20a of the vacuum cleaner 20 that is used with the trap 1 for use with a vacuum cleaner is provided in various sizes, and the trap 1 for use with a vacuum cleaner needs to accommodate these sizes. The trap 1 for use with a vacuum cleaner according to the present invention solves this problem.

Figure 8A:
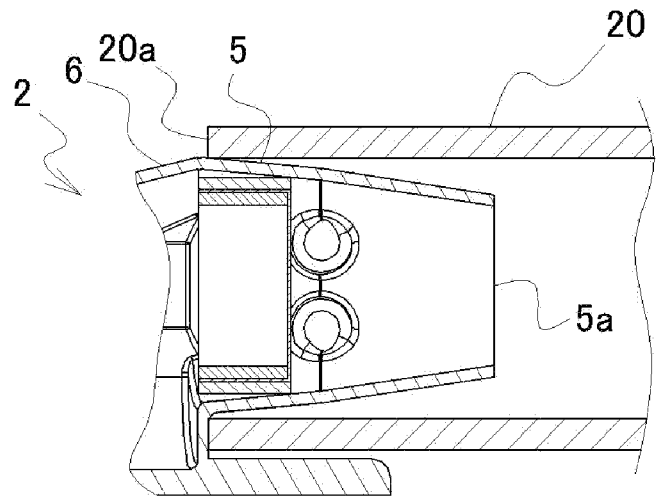
FIGS. 8(a), (b), and (c) are cross-sectional views showing that vacuum cleaner attachment portions with different diameters are attachable to the connection portion of the trap for use with a vacuum cleaner in FIG. 1.
Figure 8B:
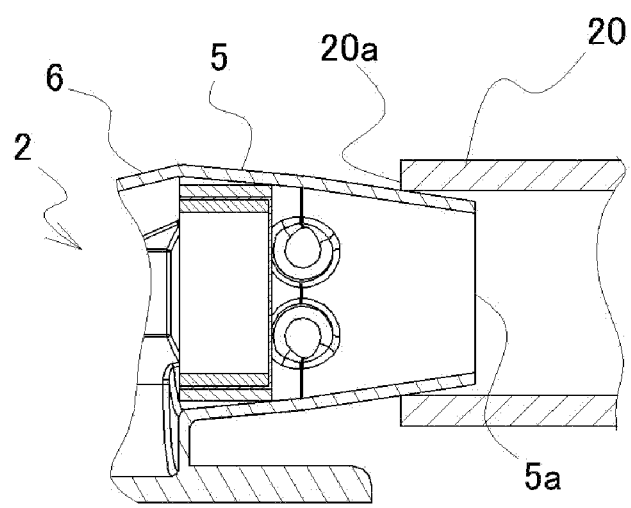
FIG. 8(b) shows a vacuum cleaner attachment portion with the smallest attachable diameter as being attached to the connection portion.
Figure 8C:
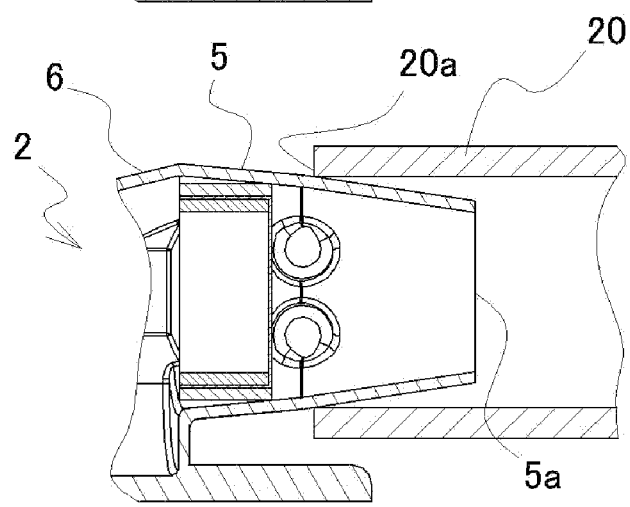
FIG. 8(c) shows a vacuum cleaner attachment portion with a diameter between the diameters in FIGS. 8(a) and 8(b) as being attached to the connection portion.

The outer surface of the connection portion 5 is at least partially tapered from the coupling portion between the step 6 and the tapered portion toward the insertion opening 5a. Thus, as shown in FIGS. 8(a) to (c), even if the vacuum cleaner attachment portion 20a has different sizes, the trap 1 for use with a vacuum cleaner can be used if the size is between the maximum size as shown in FIG. 8(a) and the minimum size as shown in FIG. 8(c). The portion with a taper (tapered portion) of the outer surface of the connection portion 5 varies in outer diameter from the coupling portion toward the insertion opening 5a, which allows the trap 1 for use with a vacuum cleaner to be used even if the vacuum cleaner attachment portion 20a has slightly different sizes.

A further problem is that the connection portion 5 needs to be stably attached to the vacuum cleaner attachment portion 20a. As a solution to this problem, the protrusion 7 is formed adjacent to the step 6, which increases the length of the region where the taper is formed in the forward-rear direction of the connection portion 5, resulting in a gradual slope. This allows the vacuum cleaner attachment portion 20a to be more securely attached to the portion with a taper (tapered portion). Furthermore, the protrusion 7 is formed at a portion of the outer surface of the connection portion 5 with a larger outer diameter, which allows the user to easily apply an external force to remove the trap 1 for use with a vacuum cleaner from the vacuum cleaner attachment portion 20a of the vacuum cleaner 20.

A further problem is that the trap 1 for use with a vacuum cleaner desirably traps the target to be trapped 30 efficiently in the inner space 8 that is limited. That is, the trap 1 for use with a vacuum cleaner desirably catches the target to be trapped 30 reliably, by blocking the inner space 8 with the net portion 3 over the widest possible region in the inner space 8. A still further problem is to prevent a reduction in the suction effect of the vacuum cleaner 20 that may be caused by narrowing of the inner diameter of the inner space 8 relative to the suction opening 4a along the way in the front-rear direction.

As solutions to these problems, the net portion 3 is mounted to a portion of the tapered portion of the connection portion 5 where the inner diameter 5d of the connection portion 5 is larger than the inner diameter 4d of the cylindrical body portion 4, which allows the target to be trapped 30 to be trapped in a wider region. Furthermore, the net 3a has an area substantially equal to the area of the plane orthogonal to the axial direction of the cylindrical body portion 4, which allows the net 3a to sufficiently pass air sucked in through the suction opening therethrough. This prevents the net portion 3 from narrowing the inner diameter of the inner space 8 and reducing the suction force of the vacuum cleaner 20, leading to increased suction efficiency of the vacuum cleaner 20.

There is also a need that the trap 1 for use with a vacuum cleaner trap targets to be trapped 30 with various sizes. In particular, there is a problem in that increasing the size of the suction opening 4a to trap a large target to be trapped 30 increases the overall size of the trap 1 for use with a vacuum cleaner, which makes the trap 1 for use with a vacuum cleaner difficult to handle. A further problem is that the trap 1 for use with a vacuum cleaner as attached to the vacuum cleaner 20 is desirably easy to operate when sucking the target to be trapped 30 through the suction opening 4a. The trap 1 for use with a vacuum cleaner according to the present invention solves this problem.

The suction opening 4a is formed to at least partially incline at an acute angle of inclination $\theta$ with respect to the axis of the cylindrical body portion 4. As shown in FIGS. 5(b) and (c), the opening length 14a is larger than the opening length 14b. Thus, the suction opening 4a has an increased opening length, compared to when it is formed at a right angle with respect to the front-rear direction, such that the suction opening 4a can suck a larger target to be trapped 30. Moreover, the tip of the suction opening 4a is at least partially inclined at an acute angle, such that the trap 1 for use with a vacuum cleaner as attached to the vacuum cleaner 20 conforms to a floor surface and thus, can easily suck in the target to be trapped 30. In particular, in the trap 1 for use with a vacuum cleaner of each of the second to fourth embodiments, the portion near the suction opening 4a increases in diameter toward the suction opening 4a. This increases the opening length of the suction opening 4a, which allows a larger target to be trapped 30 to be more easily sucked. Furthermore, the protrusion 7 is positioned on a portion in the circumferential direction, such as on the lower side, of the trap body 2, such that the trap 1 for use with a vacuum cleaner can be placed into a gap between items of furniture or the like, which allows the target to be trapped 30 present in the gap between items of furniture or the like to be easily sucked in.

A further problem is that the trap 1 for use with a vacuum cleaner needs to be configured to prevent the target to be trapped 30 from exiting through the suction opening 4a, after sucking the target to be trapped 30 into the inner space 8 of the cylindrical body portion 4. For example, if the target to be trapped 30 is small, it may jump out after hitting against the net portion 3, without being stuck to the adhesive 9. The trap 1 for use with a vacuum cleaner according to the present invention solves this problem.

Figure 17:
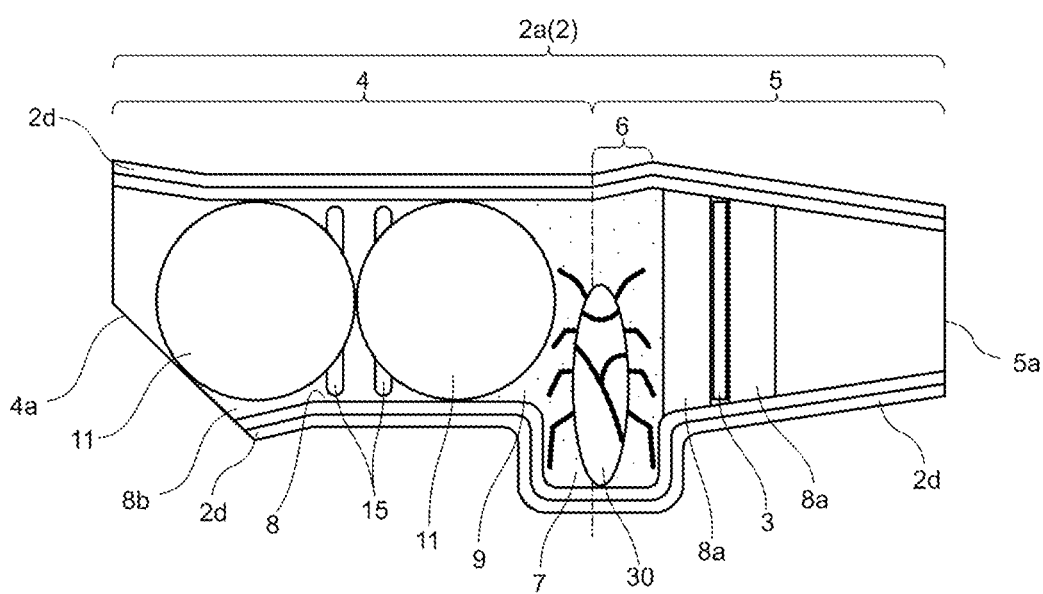
FIG. 17 is a right side view showing the trap for use with a vacuum cleaner according to the third embodiment of the present invention as having trapped a target to be trapped, wherein the second body is omitted.

The protrusion 7 has the inner space 8, and the adhesive 9 is also provided on the inner space 8 of the protrusion 7. Thus, as shown in FIG. 17, the target to be trapped 30 that is trapped by the trap 1 for use with a vacuum cleaner is caught in the inner space 8 of the protrusion 7. Even if the target to be trapped 30 is alive, the target to be trapped 30 is less likely to escape from the trap 1 for use with a vacuum cleaner, with their legs being caught in the inner space 8 of the protrusion 7. In particular, when the adhesive 9 is also provided on the inner space 8 of the protrusion 7, the target to be trapped 30 is also entangled in the adhesive 9, such that the target is even less likely to escape from the trap for use with a vacuum cleaner. While this is illustrated in FIG. 17 using the trap 1 for use with a vacuum cleaner of the third embodiment, the same applies to the trap 1 for use with a vacuum cleaner of each of the second and fourth embodiments.

The trap 1 for use with a vacuum cleaner also includes the elastic ball 11 that can be inserted through the suction opening 4a. The elastic ball 11 is sucked through the suction opening 4a by the vacuum cleaner 20 to be held in the inner surface 8b. Thus, even if the target to be trapped 30 is not stuck to the adhesive 9 after hitting against the net portion 3, the elastic ball 11 prevents the target to be trapped 30 from exiting out. Even if the target to be trapped 30 stays near the suction opening 4a, the elastic ball 11 when it is sucked can push the target to be trapped 30 into the inner space 8.

Moreover, the trap 1 for use with a vacuum cleaner of each of the second to fourth embodiments near the suction opening 4a increases in diameter toward the suction opening 4a. This allows the trap 1 for use with a vacuum cleaner to easily suck in the elastic ball 11 that is to be sucked in after sucking in the target to be trapped 30.

Furthermore, in the trap 1 for use with a vacuum cleaner of each of the second to fourth embodiments, the second recessed groove 17 or a slit is formed in the cylindrical body portion 4. Thus, when the vacuum cleaner 20 sucks in the target to be trapped 30, and continues sucking with the suction opening 4a blocked with the elastic ball 11, the pressure inside the trap body 2 drops to reduce the diameter of the trap body 2. This results in a reduced gap between the elastic ball 11 and the inner surface of the trap body 2, which makes it even less likely for the target to be trapped 30 that has been trapped to escape.

A further problem is that because the trap 1 for use with a vacuum cleaner requires the net portion 3 to be mounted to the inner space 8, it needs to overcome the difficulty with assembly. This problem is solved by constructing the trap body 2 of the trap 1 for use with a vacuum cleaner from the first body 2a and the second body 2b. Thus, the net portion 3 is sandwiched and mounted between the first body 2a and the second body 2b, which facilitates mounting of the net portion 3.

Moreover, in the trap 1 for use with a vacuum cleaner of the first embodiment, the net portion 3 is detachable upon opening of the first body 2a and the second body 2b, which facilitates replacement of the net portion 3. Furthermore, the engagement portions 8a are formed in each of the first body 2a and the second body 2b, which allows the net portion 3 to be mounted to either of the first body 2a and the second body 2b.

A further problem is that particularly when the trap 1 for use with a vacuum cleaner is of a disposable type, it is required to reduce component costs. As a solution to this problem, in the trap 1 for use with a vacuum cleaner of the first embodiment, the trap body 2 is formed of a single continuous member and thus, can be integrally molded. For example, the trap body 2 can be integrally molded by pulp molding or resin molding. This achieves a reduction in the component costs of the trap body 2.

A further problem is to increase the degree of sealing of the inner space 8 to increase the suction efficiency by the vacuum cleaner 20. The contact portions 10 where the first body 2a and the second body 2b are brought in contact with each other are joined, and the contact portions 10 are closed by the joining member 12 on at least a portion of the cylindrical body portion 4. This increases the degree of sealing of the inner space 8. The joining member 12 may be used on a portion where the degree of sealing needs to be increased, and does not necessarily need to be used over the entire contact portions 10.

In the trap 1 for use with a vacuum cleaner of each of the second to fourth embodiments, the covering 2d is formed, such that the connection between the first body 2a and the second body 2b is positioned on the inner side of the covering 2d, which prevents the adhesive that bonds the first body 2a and the second body 2b from extending out of the trap body 2. Thus, the trap body 2 can have an improved appearance.

In general, for selling the trap 1 for use with a vacuum cleaner, the trap 1 for use with a vacuum cleaner is often displayed in a small space of a sales shelf. Thus, the trap 1 for use with a vacuum cleaner tends to be displayed with the front-rear direction positioned vertically. In this case, when the adhesive 9 is a water-soluble adhesive that is generally well known as an adhesive for insect traps, the adhesive 9 may drip downward under the influence of gravity. If the trap 1 for use with a vacuum cleaner is placed with the insertion opening 5a side facing down, the adhesive 9 may drip onto the net portion 3, which damages the function of the net portion 3 to transmit air, and therefore, the trap 1 for use with a vacuum cleaner is often displayed with the suction opening 4a side facing down. In this case, the adhesive 9 may leak out of the trap body 2 through the suction opening 4a. However, in the trap 1 for use with a vacuum cleaner of each of the third and fourth embodiments, the liquid leak prevention grooves 15 are provided on the inner surface of the first body 2a and the second body 2b to cause the adhesive 9 to enter the liquid leak prevention grooves 15. This can prevent the adhesive 9 from falling down therefrom, and thus, can prevent the adhesive 9 from leaking out of the trap body 2.

While the embodiments of the present invention have been described above, the present invention is not limited to the foregoing embodiments, and various modifications are possible without departing from the spirit of the invention. For example, some elements may be omitted from all of the elements as illustrated in the embodiments. Alternatively, a plurality of elements as disclosed in each of the foregoing embodiments may be combined as appropriate to form various forms of the invention.

While the trap body 2 is constructed from the first body and the second body in the foregoing embodiments, other structures are also possible in the present invention. Rather than being formed as two separate articles, the trap body 2 may be formed as a single article by pulp molding. In this case, the outer surface of the trap body may be provided with an opening communicating with the inside, and the net portion 3 may be mounted through the opening.

INDUSTRIAL APPLICABILITY

The trap 1 for use with a vacuum cleaner of the present invention can be used for applications in which it is attached to the suction hose of a vacuum cleaner to trap a target to be trapped, for disposal of the target to be trapped in the trapped state.

REFERENCE SIGNS LIST

1: trap for use with a vacuum cleaner
2: trap body
2a: first body
2b: second body
2c: uncurved flat portions over the entire regions in the front-rear direction
3: net portion
3a: net
3b: ring-shaped outer frame
3c: ring-shaped inner frame
3d: frame
4: cylindrical body portion
4a: suction opening
4b: end
4d: inner diameter of cylindrical body portion
5: connection portion 5a: insertion opening
5b: first outer circumferential length
5c: second outer circumferential length
5d: inner diameter of connection portion
6: step
7: protrusion (flange)
7a: hinge
7b: hook
7c: gap
7d: hook ribs
8: inner space
8a: engagement portions
8b: inner surface (inner circumferential wall)
9: adhesive
10: contact portions
11: elastic ball
12: joining member
12a, 12b: adhesive tape
13: first recessed groove
14a, 14b: opening length
15: liquid leak prevention groove
17: second recessed groove
20: vacuum cleaner
20a: vacuum cleaner attachment portion
20b: vacuum cleaner hose
30: target to be trapped
θ: angle of inclination

What is claimed is:

1. A trap for use with a vacuum cleaner that is detachably attached to a suction hose of the vacuum cleaner to trap a target to be trapped by utilizing a suction force of the vacuum cleaner, the trap comprising:
a trap body with a substantially cylindrical shape, the trap body including a suction opening formed at one end to suck in the target to be trapped and an insertion opening formed at an other end to be inserted into the suction hose of the vacuum cleaner; and
a net portion mounted to the trap body to block a plane orthogonal to an axial direction of the trap body, and including a net formed in at least a portion to transmit air sucked in through the suction opening, wherein
the trap body includes, in an axially central portion, a protrusion formed on at least a portion in a circumferential direction of an outer surface thereof to protrude outward,
an adhesive is provided on at least a portion of an inner surface of the trap body,
at least one first recessed groove, extending axially and recessed radially inward, is formed near the insertion opening of the trap body,
at least one liquid leak prevention groove, extending circumferentially and bulging radially outward, is formed near the suction opening of the trap body,
the protrusion has an inner space communicating with an inner space of the trap body, and
the adhesive is also provided on an inner surface that forms the inner space of the protrusion.

2. The trap for use with a vacuum cleaner according to claim 1, wherein the trap body further comprises:
a cylindrical body portion with a substantially cylindrical shape including the suction opening; and
a connection portion with a substantially cylindrical shape, the connection portion including a step connected to an end surface of the cylindrical body portion opposite to the suction opening, and a tapered portion with the insertion opening,
wherein the connection portion has the largest inner diameter at a coupling portion between the step and the tapered portion, and the step gradually increases in inner diameter from the end surface connected to the cylindrical body portion toward the coupling portion, and the tapered portion gradually decreases in outer diameter from the coupling portion toward the insertion opening.

3. The trap for use with a vacuum cleaner according to claim 2, wherein the net portion is mounted to a portion of the tapered portion having an inner diameter larger than the inner diameter of the end surface of the step connected to the cylindrical body portion, and
the net has an area substantially equal to an area of the plane orthogonal to the axial direction of the end surface of the step connected to the cylindrical body portion.

4. The trap for use with a vacuum cleaner according to claim 1, wherein the suction opening is formed to at least partially incline at an acute angle of inclination with respect to the axial direction of the trap body.

5. The trap for use with a vacuum cleaner according to claim 1, wherein the trap body near the suction opening increases in diameter toward the suction opening.

6. The trap for use with a vacuum cleaner according to claim 1, wherein the trap further comprises one or more elastic balls insertable through the suction opening, and
the plane orthogonal to the axial direction of the trap body is blocked by all of the one or more elastic balls being sucked through the suction opening into the inner space of the trap body.

7. The trap for use with a vacuum cleaner according to claim 1, wherein the protrusion has a hook extending along the axial direction of the trap body toward the insertion opening, and
the hook has a gap between the hook and the outer surface of the trap body.

8. The trap for use with a vacuum cleaner according to claim 1, wherein the trap body further includes a first body and a second body,
the first body and the second body have a shape in which the trap body is divided into two equal parts along the axial direction,
the first body and the second body are connected by a hinge to be openable and closable,
upon closing of the first body and the second body, the net portion is sandwiched and mounted between the first body and the second body, and
upon opening of the first body and the second body, the net portion is detachable.

9. The trap for use with a vacuum cleaner according to claim 1, wherein the trap further includes at least one second recessed groove, extending axially and recessed radially inward, which is formed near the suction opening of the trap body.

10. The trap for use with a vacuum cleaner according to claim 8, wherein the hinge is formed on the protrusion,
contact portions where the first body and the second body are brought in contact with each other are joined, and
the contact portions are at least partially closed by a joining member.

11. The trap for use with a vacuum cleaner according to claim 8,
wherein the first body further includes, on an entire circumferential end surface, an integral covering that covers a circumferential end of the second body.

* * * * *